United States Patent
Mansour et al.

(10) Patent No.: US 12,287,398 B2
(45) Date of Patent: Apr. 29, 2025

(54) SYSTEM AND METHOD FOR GENERATING A RADAR IMAGE OF A SCENE

(71) Applicant: Mitsubishi Electric Research Laboratories, Inc., Cambridge, MA (US)

(72) Inventors: Hassan Mansour, Cambridge, MA (US); Suhas Lohit, Cambridge, MA (US); Petros Boufounos, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 425 days.

(21) Appl. No.: 17/649,814

(22) Filed: Feb. 3, 2022

(65) Prior Publication Data

US 2023/0129025 A1 Apr. 27, 2023

Related U.S. Application Data

(60) Provisional application No. 63/263,120, filed on Oct. 27, 2021.

(51) Int. Cl.
*G01S 13/89* (2006.01)
*G06N 3/04* (2023.01)
(Continued)

(52) U.S. Cl.
CPC ............... *G01S 13/89* (2013.01); *G06N 3/04* (2013.01); *G06T 5/70* (2024.01); *G06T 7/70* (2017.01);
(Continued)

(58) Field of Classification Search
CPC ... G01S 13/89; G06T 7/70; G06T 5/70; G06T 2207/10044; G06T 2207/20081;
(Continued)

(56) References Cited

U.S. PATENT DOCUMENTS 3,548,919 A   12/1970   Gyongyos
6,952,178 B2 * 10/2005   Kirscht ............... G01S 13/9029
                                                            342/107
(Continued)

FOREIGN PATENT DOCUMENTS

CN   103439693 A * 12/2013
CN   113269691 A *  8/2021 ........... G06K 9/6256

OTHER PUBLICATIONS

CN103439693A_Description_20240325_1840.pdf—translation of CN103439693A (Year: 2013).*
(Continued)

*Primary Examiner* — Olumide Ajibade Akonai
*Assistant Examiner* — Yonghong Li
(74) *Attorney, Agent, or Firm* — Gene Vinokur

(57) ABSTRACT

The present disclosure provides a system and a method for generating a radar image of a scene. The method comprises receiving radar measurements of a scene collected from a set of antennas, wherein the set of antennas are under uncertainties caused by one or a combination of position ambiguities and clock ambiguities of each of the antennas. The method further comprises generating the radar image of the scene by solving a sparse recovery problem. The sparse recovery problem determines, until a termination condition is met, a set of image shifts of the radar image corresponding to different uncertainties of the antennas and updates an estimate of the radar image, based on the determined set of image shifts of the radar image. The sparse recovery problem is solved with a neural network denoiser that denoises a filtering of the estimate of the radar image.

17 Claims, 24 Drawing Sheets

(51) Int. Cl.
*G06T 5/70* (2024.01)
*G06T 7/70* (2017.01)

(52) U.S. Cl.
CPC ............... *G06T 2207/10044* (2013.01); *G06T 2207/20081* (2013.01); *G06T 2207/20084* (2013.01)

(58) Field of Classification Search
CPC . G06T 2207/20084; G06T 5/002; G06T 5/60; G06N 3/04; G06N 3/0455; G06N 3/0464; G06N 3/08
See application file for complete search history.

(56) References Cited

U.S. PATENT DOCUMENTS

| | | | |
|---|---|---|---|
| 2008/0297405 A1* | 12/2008 | Morrison, Jr. ...... | G01S 13/9019 342/25 F |
| 2018/0106805 A1 | 4/2018 | Allen | |
| 2020/0284900 A1* | 9/2020 | Mansour ................ | G01S 13/90 |
| 2021/0153085 A1 | 5/2021 | Rahman | |

OTHER PUBLICATIONS

CN113269691A_Description_20240322_1513.pdf—translation of CN113269691A (Year: 2021).*
CN103439693_Fig1—translation of CN 103439693A Fig.1 (Year: 2013).*
CN113269691_Fig1_Google Translate—translation of CN113269691A Fig. 1 (Year: 2021).*
CN113269691_Fig2_Google Translate.pdf—translation of CN113269691A Fig2 (Year: 2021).*
B. Wen, Y. Li and Y. Bresler, "Image Recovery via Transform Learning and Low-Rank Modeling: The Power of Complementary Regularizers," in IEEE Transactions on Image Processing, vol. 29, pp. 5310-5323, 2020, doi: 10.1109/TIP.2020.2980753. (Year: 2020).*
Gregory Ongie et al. "Deep learning techniques for inverse problems in imaging," arxiv.org, Cornell Univ. Library, 201 Olin Library Cornell Uni, Ithaca, NY 14853, May 12, 2020.
H. Mansour, D. Liu, U. S. Kamilov and P. T. Boufounos, "Sparse Blind Deconvolution for Distributed Radar Autofocus Imaging," in IEEE Transactions on Computational Imaging, vol. 4, No. 4, pp. 537-551, Dec. 2018, doi: 10.1109/TCI.2018.2875375.
M. A. Lodhi, H. Mansour and P. T. Boufounos, "Coherent Radar Imaging Using Unsynchronized Distributed Antennas," ICASSP 2019—2019 IEEE International Conference on Acoustics, Speech and Signal Processing (ICASSP), 2019, pp. 4320-4324, doi: 10.1109/ICASSP.2019.8683320.

* cited by examiner

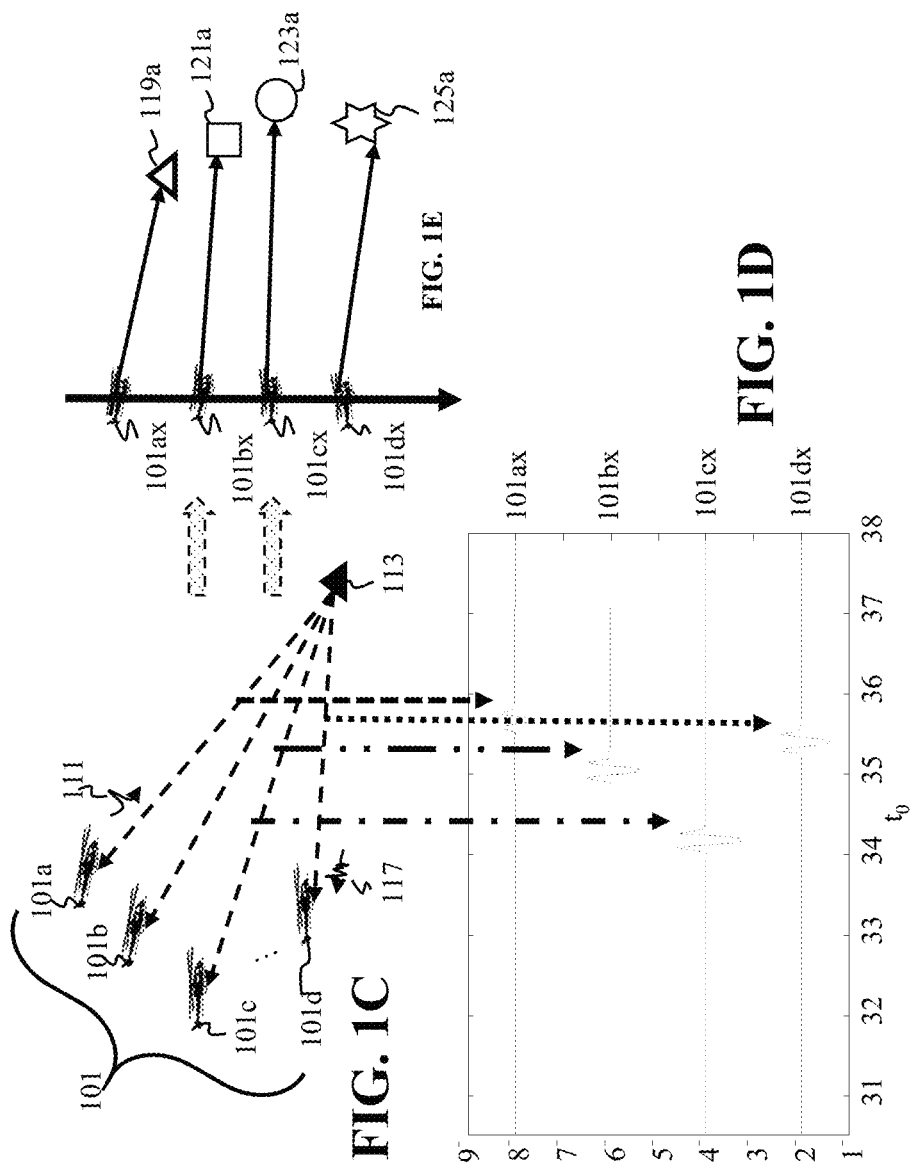

input: measurements $\{\bar{y}_m\}_{m=1}^M$, initial guess $x^0, h^0$, maximum subroutine iterations $T$, and regularization parameters $\lambda, \mu$.

set: $j \leftarrow 1$; $\tilde{h}_m^0, \hat{h}_m^0 \leftarrow h^0$ for all $m$ ~ 901

1: repeat
2:     $A_x^m \leftarrow A_x^m(\hat{h}_m^{j-1})$ for all $m$ ~ 903
3:     $x^j \leftarrow \texttt{fista}(\{A_x^m\}_{m=1}^M, \lambda R_x, \{\bar{y}_m\}_{m=1}^M, x^{j-1}, T)$ ~ 905
4:     for $m \leftarrow 1$ to $M$ do
5:        $A_h^m \leftarrow A_h^m(x^j)$
6:        $\tilde{h}_m^j \leftarrow \texttt{fista}(A_h^m, \mu R_h, \bar{y}_m, \tilde{h}_m^{j-1}, T)$
7:        $\hat{h}_m^j \leftarrow P(\tilde{h}_m^j)$ ~ 907
8:     $j \leftarrow j+1$
9: until stopping criterion return: estimate of the radar image $x^j$.

FIG. 9A input: $A_h^{rr}, \mu R_h, \tilde{y}_m, \tilde{h}_m^{j-1}, T.$ set: $q_0 = 1, u^0 = s^0 = \tilde{h}_m^{j-1}$ $\alpha \leftarrow$ inverse of maximum eigenvalue of $A_h^{rrH} A_h^{rr}$ 1: for $t \leftarrow 1$ to $T$ do
2: $\quad z^t \leftarrow s^{t-1} + \alpha A_h^{rrH}(\tilde{y}_m - A_h^{rr} s^{t-1})$
3: $\quad u^t \leftarrow \mathcal{T}_+(z^t; \alpha\mu)$
4: $\quad u^t \leftarrow \frac{1}{\|u^t\|} u^t$
5: $\quad q_t \leftarrow \frac{1 + \sqrt{1 + 4q_{t-1}^2}}{2}$
6: $\quad s^t \leftarrow u^t + \frac{q_{t-1} - 1}{q_t}(u^t - u^{t-1})$ return: $s^T$.

FIG. 9B input: $\{A_x^m\}_{m=1}^M, \lambda R_x, \{y_m\}_{m=1}^M, x^{j-1}, T$.

set: $q_0 = 1, u^0 = s^0 = x^{j-1}$

1: $\alpha \leftarrow$ inverse of maximum eigenvalue of $\sum_{m=1}^M A_x^{mH} A_x^m$ 2: for $t \leftarrow 1$ to $T$ do

3: $\quad z^t \leftarrow s^{t-1} + \alpha \sum_{m=1}^M A_x^{mH}(y_m - A_x^m s^{t-1})$ 4: $\quad v^t \leftarrow \sum_{m=1}^M A_x^{mH} A_x^m z^t$ 5: $\quad u^t \leftarrow \mathcal{T}(v^t)$ 6: $\quad q_t \leftarrow \dfrac{1+\sqrt{1+4q_{t-1}^2}}{2}$ 7: $\quad s^t \leftarrow u^t + \dfrac{q_{t-1}-1}{q_t}(u^t - u^{t-1})$ return: $s^T$.

SYSTEM AND METHOD FOR GENERATING A RADAR IMAGE OF A SCENE

TECHNICAL FIELD

The present disclosure relates generally to radar systems, and more particularly to a system and a method for generating a radar image of a scene.

BACKGROUND

High resolution radar imaging is used in a variety of remote sensing applications including synthetic aperture radar (SAR) and through-the-wall radar imaging (TWI). A down-range resolution of a radar is controlled by a bandwidth of a transmitted pulse, and a cross-range (azimuth) resolution depends on an aperture of a radar array. Generating a large physical aperture is practically achieved by deploying a number of distributed antennas or arrays, each having a relatively small aperture. The distributed setup of antennas allows for flexibility of radar platform placement, reduces operational and maintenance costs, and adds robustness to sensor failures. Leveraging prior knowledge of a scene, such as sparsity, precise knowledge of antenna positions and a full synchronization of received signals has been shown to significantly improve radar imaging resolution.

A major challenge in the radar imaging using the distributed setup is being able to identify the positions of antennas due to inaccurate calibration or various position perturbations. Although modern navigation systems such as Global Positioning System (GPS) can measure positions, possible position errors due to the position perturbations are beyond scope of high-resolution distributed radar imaging. For example, for a vehicle mounted radar system, as the vehicle is moving along a predesigned trajectory, the position perturbations are introduced due to non-smooth road surface or varying driving velocity and direction. These position perturbations can be as large as several wavelengths of a radar center frequency. Consequently, applying standard reconstruction techniques without accounting for the position perturbations produces out-of-focus radar images.

There are multitude of solutions that addressed radar autofocus problem, particularly in the SAR setting, by developing tools that compensate for the antenna position errors. However, this problem is ill-posed and solving this problem is a computationally demanding process with a difficult to find solution. To that end, some methods impose additional constraints on the radar autofocus problem to make this problem tractable. However, those additional constraints are not always desirable.

Therefore, there is a need for radar imaging systems and methods for autofocusing of antennas having unknown position perturbations.

SUMMARY

It is an object of some embodiments to provide a radar system and a method for generating a radar image of a scene by fusing measurements of various antennas having unknown position perturbations, Specifically, it is an object of some embodiments to formulate a neural network denoiser based radar autofocus problem for producing the radar image of the scene.

Some embodiments are based on an understanding that a fundamental challenge that arises in distributed array imaging (i.e., distributed antennas setup) comes from uncertainties caused by one or a combination of position ambiguities and clock ambiguities of each antenna of the set of antennas. Some embodiments of are based on the recognition that radar autofocus problems of the distributed antennas with the position ambiguities can be an ill-posed problem with a vast number of unknowns. Specifically, when the radar autofocus problem is formulated as recovering a correct radar image from incorrect measurements caused by an incorrect radar operator encoding the position ambiguities, each measurement of a region of interest (ROI) includes an error caused by the position ambiguities. Further, due to non-linearity of relationships between the measurements and the errors in the positions of the antennas, each sample of the measurements from the same antenna can have a different error, thereby increasing a number of unknowns in a model of the radar autofocus problem.

For example, a radar image is to be recovered by processing F-dimensional frequency-domain measurements $\{\tilde{y}_m\}_{m=1}^M$ from M distributed antennas with the position ambiguities. The position ambiguity can be modeled as a time-domain convolution with the measurements, or equivalently, as a gain and phase ambiguity in a frequency-domain of the measurement, that is, $$\tilde{y}_m = D_{\hat{g}_m} A_m x \tag{1}$$

where $D_{\hat{g}_m}$ is a diagonal matrix with a phase correction vector $\hat{g}_m \in \mathbb{C}^F$ on its diagonal entries and where $g_m$ is also of dimension F, $A_m$ is a radar operator defined by an assumed position of the antennas, and x is an unknown radar image of size sqrt(N) by sqrt(N) resulting in a total of N unknown values for the radar image x. N is generally much larger than F. Every new measurement $y_m$ adds F equations but also results in F N unknowns. Therefore, for M measurements, a resulting system of equations includes MF equations with MF N unknowns. This is problematic since a number of unknowns will always be larger than a number of equations irrespective of a number of the measurements.

Some embodiments are based on realization that the radar autofocus problem can be reformulated as recovering an incorrect radar image from correct measurements and a correct radar operator. On one hand, such a reformulation does not make sense. However, some embodiments are based on the realization that the incorrect radar image determined via such a formulation of the radar autofocus problem can relate to the correct radar image through a linear shift. Due to this linearity, each sample of the measurements from the same antenna represents the correct radar image with the same linear shift.

To that end, the position ambiguity can be modeled as a spatial shift kernel in a domain of the radar image x. Specifically, a new measurement model is given by $$\tilde{y}_m = A_m(x * h_m) \tag{2}$$

where * is a spatial convolution operator and $h_m$ is a sqrt(P) by sqrt(P) shift kernel that captures the position ambiguity. Here, P is much smaller than N and is also smaller than F. As a result, collecting M measurements results in a system of equations with MF equations and MP+N unknowns. Therefore, there exists a suitable number of measurements M, such that MF is larger than MP+N. Specifically, when M>N/(F−P), then the radar autofocus problem may be solved.

Therefore, the measurements of each antenna are modelled as a product of the radar operator, the radar image, and the shift kernel.

Some embodiments are based on further realization that a regularizer can be utilized for both the radar image x and the shift kernel $h_m$ to reduce the necessary number of measurements M. One example of a regularizer for the radar image x is a fused Lasso regularizer. According to an embodiment, true objects in the radar image x have a radar signature that is sparse, i.e. most of the radar image x is zero-valued, and locations of nonzero entries tend to cluster together. The fused Lasso regularizer assigns a small cost to radar images that are sparse and when the locations of the nonzero entries cluster together. As a result, for a radar image x with K nonzero entries in its spatial gradient domain, a true number of unknowns of the radar image x can be represented by K log(N) unknowns. Similarly, the shift kernels $h_m$ are one-sparse and have a true number of unknowns represented by log(P). Therefore, a resulting system of equations includes MF equations with M log(P)+K log(N) unknowns when the fused Lasso regularizer is used. Thus, it is sufficient for M to be larger than log(N)/(F−log(P)) to be able to solve the radar autofocus problem.

As an example, consider a radar autofocus problem where F=100, N=100×100=10000, P=10×10=100, and K=3. For M=5 measurement vectors $y_m$, the measurement model (1) results in a system with 500 equations with approximately 500+3 times log(10000)=528 unknowns. On the other hand, the new measurement model (2) results in a system with 500 equations and approximately 5 times log(100)+3 times log(10000)=51 unknowns. This reduction in the number of the unknowns of the radar autofocus problem allows to solve the radar autofocus problem in an efficient manner.

Some embodiments are based on recognition that that the image shifts (i.e., the shift kernels) and the radar image can be determined using an alternating optimization. For example, in an embodiment, the radar image is updated while fixing the image shifts and the image shifts are updated while fixing the radar image.

In the alternating optimization, at first, an estimate of the radar image is produced. Next, a set of image shifts corresponding to different uncertainties of the antennas are estimated. Then, the estimate of the radar image is updated based on the determined set of image shifts, such that, for each of the antennas, the estimate of the radar image shifted by the corresponding image shift fits the measurements of the antenna. The steps of estimating the set of image shifts followed by updating the estimate of the radar image are conducted iteratively until a terminal condition is met. When the terminal condition is met, a focused radar image is outputted.

According to an embodiment, the estimate of the radar image is produced by minimizing a difference between radar reflections and modelled measurements synthesized based on transmitted pulses and erroneous antenna positions. Further, a regularizer is applied on the estimated radar image to filter noise from the estimated radar image. In an embodiment, the regularizer may be the fused Lasso regularizer that includes a one norm regularizer and a total variation (TV) regularizer. The one norm regularizer imposes sparsity on the estimated radar image, while the TV regularizer reduces noise in the estimated radar image to produce a filtered radar image. The steps of minimizing the difference between the radar reflections and the modelled measurements and applying the regularizer are conducted iteratively until convergence. Upon convergence, the estimate of the radar image is outputted.

Some embodiments are based on observation that the regularizer (e.g., the fused Lasso regularizer) used in the alternating optimization to filter the estimated radar image may not be suitable when the noise in the estimated radar image is large because the noise may introduce image-domain artifacts that also tend to cluster together and therefore resemble a shape of true targets. As a result, the alternating optimization may focus on a false object and consequently produce incorrect antenna position correction.

Some embodiments are based on realization that, to mitigate such a problem, a neural network denoiser can be used instead of the regularizer. The neural network denoiser includes a neural network trained to denoise the estimated radar image. In other words, the neural network denoiser filters the noise from the estimated radar image. The neural network denoiser is advantageous over the regularizer because of high modelling power of the neural network and its ability to represent signal structure that surpasses an explicit sparsity in image domain and its gradient.

To that end, for estimating the radar image, instead of applying the regularizer on the estimated radar image, the neural network denoiser is applied.

Some embodiments are on recognition that artifacts/ noises in the estimated radar image are due to iterative update steps that occur during the minimization of the difference between the radar reflections and the modelled measurements. The artifacts/noises due to the iterative update steps are unknown and unpredictable and may not be same as noise that the neural network is trained on. Therefore, the estimated radar image may include noises that the neural network denoiser is not trained on. When such radar images are applied to the neural network denoiser, the neural network denoiser may inject errors in the output radar image. Therefore, merely replacing the regularizer with the neural network denoiser is not sufficient and may pose problems.

Some embodiments are based on realization that to manage the noises that the that the neural network denoiser is not trained on, the estimated radar image can be filtered, prior to applying the estimated radar image to the neural network denoiser, by applying a forward radar operator and an adjoint radar operator on the estimated radar image. The forward and the adjoint operator filters the noise from the estimated radar image that the neural network is not trained on, to produce a filtered radar image. Further, the filtered radar image is applied to the neural network denoiser. As a result, the neural network denoiser does not inject errors in the output radar image and reconstruction of the radar image remains stable.

According to an embodiment, the neural network denoiser that denoises a filtering of the estimate of the radar image, includes a residual Unet architecture. The residual Unet architecture is symmetric and includes two parts, namely, left part and right part. The left part is called contracting path, which is constituted by a general convolutional process. The right part is expansive path, which is constituted by transposed 2d convolutional layers. Additionally or alternatively, in some embodiments, the neural network denoiser includes a denoising convolutional neural network architecture.

Some embodiments are based on realization that since the forward and the adjoint radar operators filter the noise from the estimated radar image, that the neural network denoiser is not trained on, the neural network denoiser need not be trained with a large training dataset including all possible noises that may be observed in the alternative optimization. Thus, the neural network denoiser can be trained with a simpler training dataset. In an embodiment, the simpler training dataset includes input-output pairs $(z_m, x_m)$, where training input images $z_m$ are back projected images formed by applying the back projection operator $A_m^H$ to example radar measurements $y_m = A_m x_m + n$, such that, $z_m = A_m^H y_m$; and the output images $x_m$ are ground truth object radar images, and where n represents added noise. As the neural network denoiser can be trained with the simple training dataset, the training of the neural network denoiser becomes easier and faster.

Additionally, some embodiments are based on recognition that the neural network denoiser based radar autofocus problem of the present disclosure is capable of reconstructing the objects with fewer measurements. This feature allows the embodiments of the present embodiments to be deployed in an object tracking system where radar characteristics of the objects are determined at a rate that is faster than motion of the objects. Such a process allows to continuously detect the objects and perform object tracking-by-detection.

Moreover, detections of moving objects received from the radar reflections may sometimes provide a partial view of the object when the object has a large extension relative to a beam width of the radar. In such scenarios, the neural network denoiser can be trained to reconstruct a partial shape of the object that is intended to be tracked instead of reconstructing point objects of strong reflectors of the object. The reconstructed partial shapes can then be used to facilitate additional modules that determine a current state of the object, where the state of the object includes information on size, orientation, and direction of the moving object.

Accordingly, one embodiment discloses a system for generating a radar image of a scene. The system comprises at least one processor; and a memory having instructions stored thereon that, when executed by the at least one processor, cause the system to: receive radar measurements of a scene collected from a set of antennas, wherein the radar measurements are measurements of reflections associated with a radar pulse transmitted to the scene; generate the radar image of the scene by solving a sparse recovery problem, wherein the sparse recovery problem is configured to determine a set of image shifts of the radar image corresponding to different uncertainties of the antennas and update an estimate of the radar image, based on the determined set of image shifts of the radar image, until a termination condition is met, such that, for each of the antennas, the estimate of the radar image shifted by the corresponding shift of the radar image fits the radar measurements of the antenna, wherein the sparse recovery problem is solved with a neural network denoiser that denoises a filtering of the estimate of the radar image; and render the radar image when the termination condition is met.

Accordingly, another embodiment discloses a method for generating a radar image of a scene. The method comprises receiving radar measurements of the scene collected from a set of antennas, wherein the radar measurements are measurements associated with reflections of a radar pulse transmitted to the scene; generating the radar image of the scene by solving a sparse recovery problem, wherein the sparse recovery problem is configured to determine a set of image shifts of the radar image corresponding to different uncertainties of the antennas and update an estimate of the radar image, based on the determined set of image shifts of the radar image, until a termination condition is met, such that, for each of the antennas, the estimate of the radar image shifted by the corresponding shift of the radar image fits the radar measurements of the antenna, wherein the sparse recovery problem is solved with a neural network denoiser that denoises a filtering of the estimate of the radar image; and rendering the radar image when the termination condition is met.

Accordingly, yet another embodiment discloses a non-transitory computer-readable storage medium embodied thereon a program executable by a processor for performing a method for generating a radar image of a scene. The method comprises receiving radar measurements of the scene collected from a set of antennas, wherein the radar measurements are measurements of reflections associated with a radar pulse transmitted to the scene; generating the radar image of the scene by solving a sparse recovery problem, wherein the sparse recovery problem is configured to determine a set of image shifts of the radar image corresponding to different uncertainties of the antennas and update an estimate of the radar image, based on the determined set of image shifts of the radar image, until a termination condition is met, such that, for each of the antennas, the estimate of the radar image shifted by the corresponding shift of the radar image fits the radar measurements of the antenna, wherein the sparse recovery problem is solved with a neural network denoiser that denoises a filtering of the estimate of the radar image; and rendering the radar image when the termination condition is met.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1C and FIG. 1D are schematics, when viewed together, illustrate distortion that affects a measured time domain signal of each antenna due uncertainty in antenna positions, when measuring reflection of a single object, according to embodiments of the present disclosure.

FIG. 1E is a schematic illustrating a mapping between a set of antennas having perturbed positions and measuring reflection of a single object to a set of antennas having uniform linear positions and measuring shifted versions of the same object, according to embodiments of the present disclosure.

FIG. 9A shows a block coordinate descent algorithm, according to some embodiments of the present disclosure.

FIG. 9B shows an algorithm of fast iterative shrinkage/thresholding algorithm (FISTA) subroutine for updating shift kernel $h_m$, according to some embodiments of the present disclosure.

FIG. 9C shows an algorithm of FISTA subroutine for radar image x, according to some embodiments of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
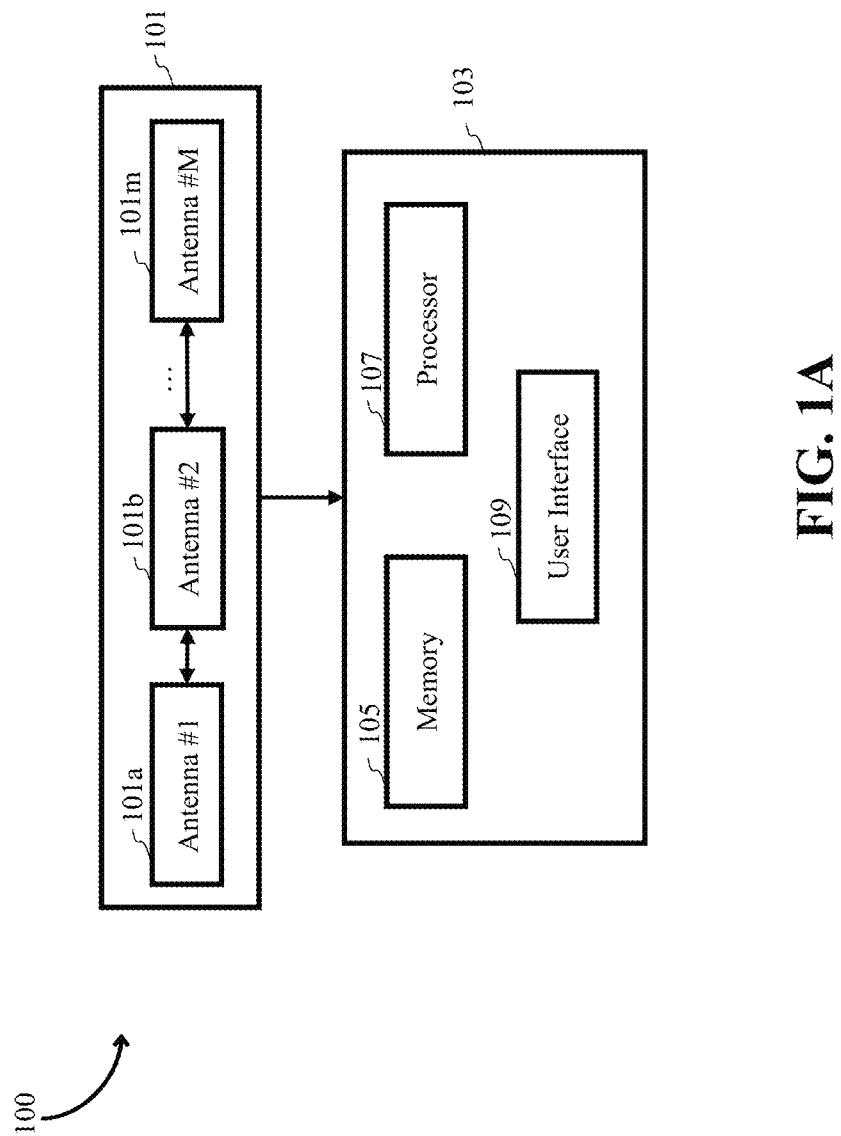
FIG. 1A shows a block diagram of a radar system for generating a radar image of a scene, according to an embodiment of the present disclosure.

FIG. 1A shows a block diagram of a radar system 100, according to an embodiment of the present disclosure. The radar system 100 includes a set of antennas 101 and a system 103 for generating the radar image of the scene. The scene may be a region of interest that includes one or more objects. The one or more objects may include stationary objects and/or moving objects. The set of antennas 101 includes M distributed antennas 101a, 101b, . . . , 101m that can communicate with each other. The system 103 includes a memory 105, a processor 107, and a user interface 107. The set of antennas 101 is configured to transmit radar pulses to the scene and receive corresponding reflections. The reflections of the radar pulses transmitted to the scene are referred to as radar measurements (hereinafter 'measurements'). The measurements may be stored in the memory 105. The processor 107 is configured to solve a sparse recovery problem to produce an auto-focused high resolution two-dimensional (2D) radar image of the scene. The user interface 109 is configured to render the produced radar image.

Figure 1B:
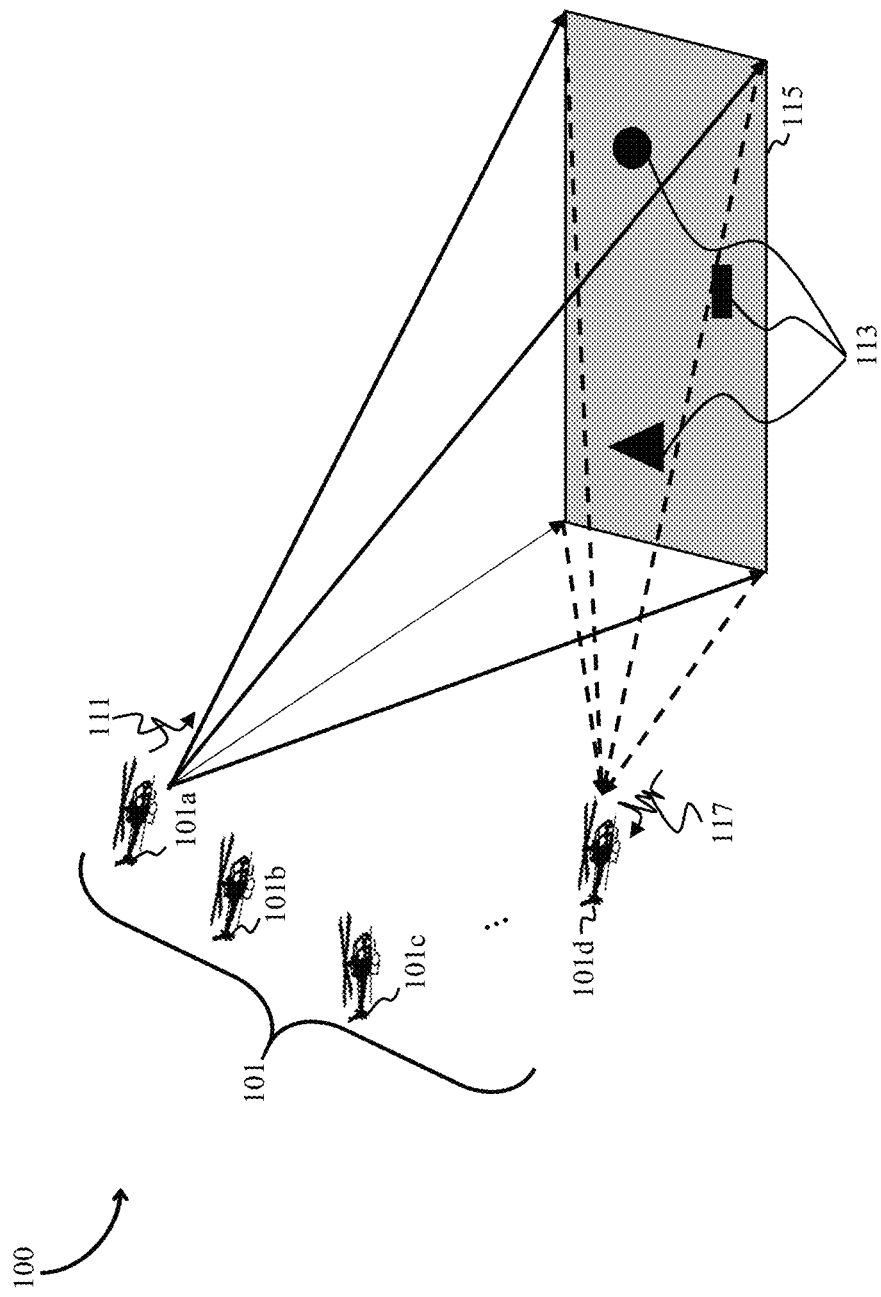
FIG. 1B is a schematic illustrating the radar system, according to embodiments of the present disclosure.

FIG. 1B is a schematic illustrating the radar system 100, according to embodiments of the present disclosure. The radar system 100 may be an airborne platform or a vehicle mounted platform that includes at least one moving antenna, and a set of M distributed moving receiver platforms or receivers. For instance, the set of antennas 101 may be moving in space along a predefined trajectory. To that end, the set of antennas comprises at least one antenna, such as the antenna 101a, the antenna 101b, the antenna 101c, and the antenna 101d. It may be understood by one of ordinary skill in the art that four antennas (101a-101d) are shown in FIG. 1B for exemplar purpose. In practice, any number of antennas may be used to achieve the functionalities of the radar system 100 described herein, without deviating from the scope of the present disclosure.

Radar pulses 111 are transmitted from the at least one antenna 101a, to illuminate objects 113 situated in a region of interest (ROI) 115, and corresponding reflections 117 reflected by the objects 113 are recorded by the distributed antennas 101a, 101b, 101c and 101d. The reflections 117 are characterized as a weighted combination of delayed pulses, where complex weights depend on specific object reflectivity and antenna patterns. Given the transmitted pulses 111 and the reflections 117, the radar image can be generated in a range-azimuth plane according to corresponding weights and delays. Azimuth resolution of the radar image depends on a size of an array aperture, and a range resolution depends on a bandwidth of the transmitted pulses 111.

A fundamental challenge that arises in distributed array imaging (i.e., distributed antennas setup) comes from uncertainties caused by one or a combination of position ambiguities and clock ambiguities of each antenna of the set of antennas 101. As used herein, the position ambiguities correspond to error or uncertainty in positions of the set of antennas 101. As used herein, the clock ambiguities indicate that clocks of the set of antennas 101 may or may not be synchronized, the set of antennas 101 can be either synchronous or asynchronous. While advanced positioning and navigation systems, such as global navigation satellite system (GPS/GNSS) and inertial navigation system (INS) provide somewhat accurate location information, remaining uncertainty in antenna positions can span multiple wavelengths. As a result, the measurements contain a gain and phase ambiguity when inexact antenna positions are used as reference. Consequently, applying standard reconstruction techniques without accounting for the uncertainty in the antenna positions produces out-of-focus radar images.

FIG. 1C and FIG. 1D are schematics, that when viewed together, illustrate distortion that affects a measured time domain signal of each antenna due to the uncertainty (or error) in the antenna positions, when measuring reflection of the object 113, according to embodiments of the present disclosure. Further, FIGS. 1C and 1D are schematics illustrating effect of the position perturbations of the different antennas, on aligning in time of the reflections.

Further, some embodiments of are based on the recognition that radar autofocus problems of the distributed antennas with the position ambiguities can be an ill-posed problem with a vast number of unknowns. Specifically, when the radar autofocus problem is formulated as recovering a correct radar image from incorrect measurements caused by an incorrect radar operator encoding the position ambiguities, each measurement of the ROI 115 includes an error caused by the position ambiguities. Further, due to non-linearity of relationships between the measurements and the errors in the positions of the antennas (such as the antennas 101a-101d), each sample of the measurements from the same antenna can have a different error, thereby increasing a number of unknowns in a model of the radar autofocus problem.

For example, a radar image is to be recovered by processing F-dimensional frequency-domain measurements $\{\tilde{y}_m\}_{m=1}^M$ from M distributed antennas with the position ambiguities. The position ambiguity can be modeled as a time-domain convolution with the measurements, or equivalently, as a gain and phase ambiguity in a frequency-domain of the measurement, that is, $$\tilde{y}_m = D_{\hat{g}_m} A_m x \quad \text{(i)}$$

where $D_{\hat{g}_m}$ is a diagonal matrix with a phase correction vector $\hat{g}_m \in C^F$ on its diagonal entries and where $g_m$ is also of dimension F, is a radar operator defined by an assumed position of the antennas, and x is an unknown radar image of size sqrt(N) by sqrt(N) resulting in a total of N unknown values for the radar image x. N is generally much larger than F. Every new measurement $y_m$ adds F equations but also results in F N unknowns. Therefore, for M measurements, a resulting system of equations includes MF equations with MF N unknowns. This is problematic since a number of unknowns will always be larger than a number of equations irrespective of a number of the measurements.

Some embodiments are based on realization that the radar autofocus problem can be reformulated as recovering an incorrect radar image from correct measurements and a correct radar operator. On one hand, such a reformulation does not make sense. However, some embodiments are based on the realization that the incorrect radar image determined via such a formulation of the radar autofocus problem can relate to the correct radar image through a linear shift. Due to this linearity, each sample of the measurements from the same antenna represents the correct radar image with the same linear shift.

To that end, the position ambiguity can be modeled as a shift kernel in a domain of the radar image x. Specifically, a new measurement model is given by $$\tilde{y}_m = A_m(x * A_m) \quad \text{(ii)}$$

where * is a spatial convolution operator and $h_m$ is a sqrt(P) by sqrt(P) shift kernel that captures the position ambiguity. Here, P is much smaller than N and is also smaller than F. As a result, collecting M measurements results in a system of equations with MF equations and MP+N unknowns. Therefore, there exists a suitable number of measurements M, such that MF is larger than MP+N. Specifically, when M>N/(F−P), then the radar autofocus problem may be solved.

Therefore, the measurements of each antenna are modelled as a product of the radar operator, the radar image, and the shift kernel.

FIG. 1E is a schematic illustrating a mapping between the set of antennas 101 having perturbed positions and measuring the reflection of a single object to the set of antennas 101 having uniform linear positions and measuring shifted versions of the same object from FIG. 1C and FIG. 1D, according to embodiments of the present disclosure. Further, FIG. 1E is a schematic of a signal model that measured reflections of a single object at the perturbed antenna positions is equivalent to measuring shifted versions of the same object at the erroneous positions of the set of antennas 101.

Figure 1F:
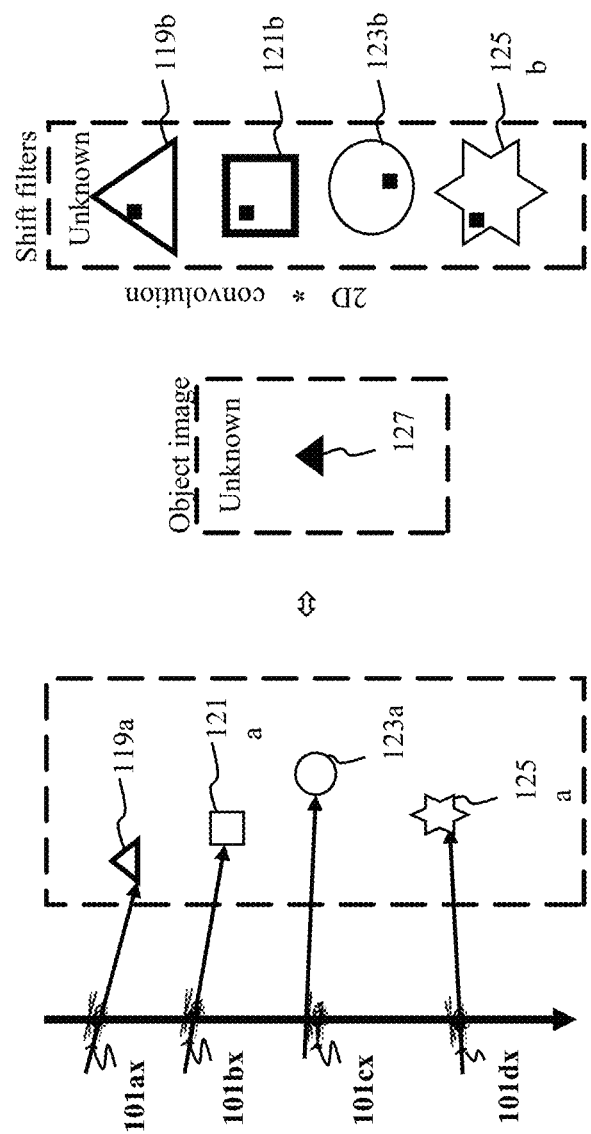
FIG. 1F is a schematic illustrating a relationship between shifted object images and true object image convolved with a set of shift kernels, according to embodiments of the present disclosure.

FIG. 1F is a schematic illustrating a relationship between shifted object images 119a, 121a, 123a, 125a and a true object image 127 convolved with a set of shift kernels 119b, 121b, 123b, 125b, according to an embodiment of the present disclosure. Measured reflections 101ax, 101bx, 101cx, 101dx in FIG. 1D correspond to measurements of the true object 113 by the set of antennas 101 located at perturbed positions in FIG. 1C. These same measured reflections also correspond to radar reflections of shifted objects 119a, 121a, 123a, 125a by the set of antennas 101 located at erroneous antenna positions in FIG. 1E, which in turn are shown to be equivalent to reflections of the true object 113 that is convolved with the set of shift kernels 119b, 121b, 123b, 125b in FIG. 1F.

Some embodiments are based on further realization that a regularizer can be utilized for both the radar image x and the shift kernel $h_m$ to reduce the necessary number of measurements M. One example of a regularizer for the radar image x is a fused Lasso regularizer. According to an embodiment, true objects in the radar image x have a radar signature that is sparse, i.e. most of the radar image x is zero-valued, and locations of nonzero entries tend to cluster together. The fused Lasso regularizer assigns a small cost to radar images that are sparse and when the locations of the nonzero entries cluster together. As a result, for a radar image x with K nonzero entries in its spatial gradient domain, a true number of unknowns of the radar image x can be represented by K log(N) unknowns. Similarly, the shift kernels $h_m$ are one-sparse and have a true number of unknowns represented by log(P). Therefore, a resulting system of equations includes MF equations with M log(P)+K log(N) unknowns when the fused Lasso regularizer is used. Thus, it is sufficient for M to be larger than log(N)/(F−log(P)) to be able to solve the radar autofocus problem.

As an example, consider a radar autofocus problem where F=100, N=100×100=10000, P=10×10=100, and K=3. For M=5 measurement vectors ym, the measurement model (i) results in a system with 500 equations with approximately 500+3 times log(10000)=528 unknowns. On the other hand, the new measurement model results in a system with 500 equations and approximately 5 times log(100)+3 times log (10000)=51 unknowns. This reduction in the number of the unknowns of the radar autofocus problem allows to solve the radar autofocus problem in an efficient manner.

Further, some embodiments are based on recognition that the set of shift kernels (hereinafter 'a set of image shifts') and the radar image can be determined using an alternating optimization. For example, in an embodiment, the radar image is updated while fixing the set of image shifts and the set of image shifts are updated while fixing the radar image.

Figure 2A:
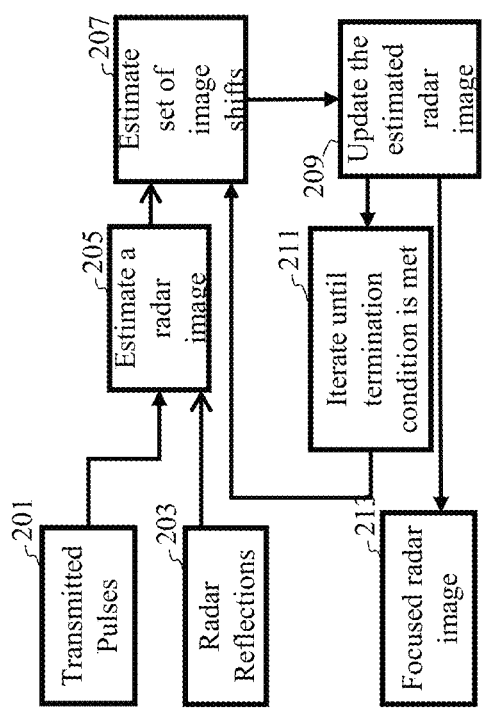
FIG. 2A shows a block diagram of an alternating optimization for estimating the radar image and a set of image shifts, according to an embodiment of the present disclosure.
Figure 2B:
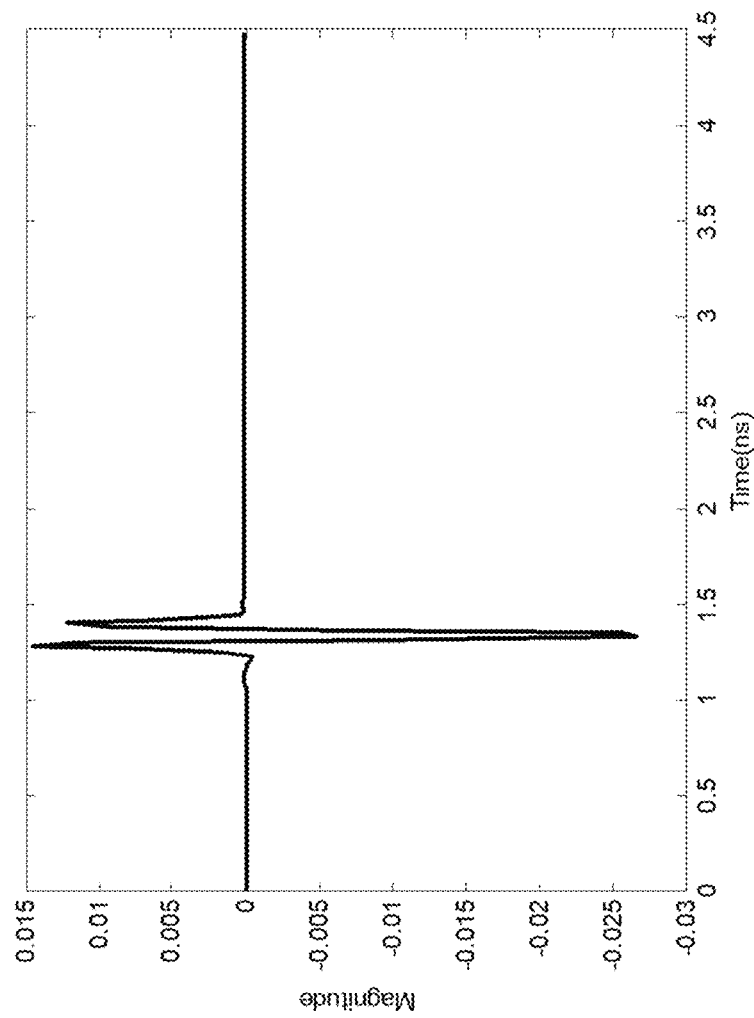
FIG. 2B shows a graph illustrating transmitted pulses, according to an embodiment of the present disclosure.
Figure 2C:
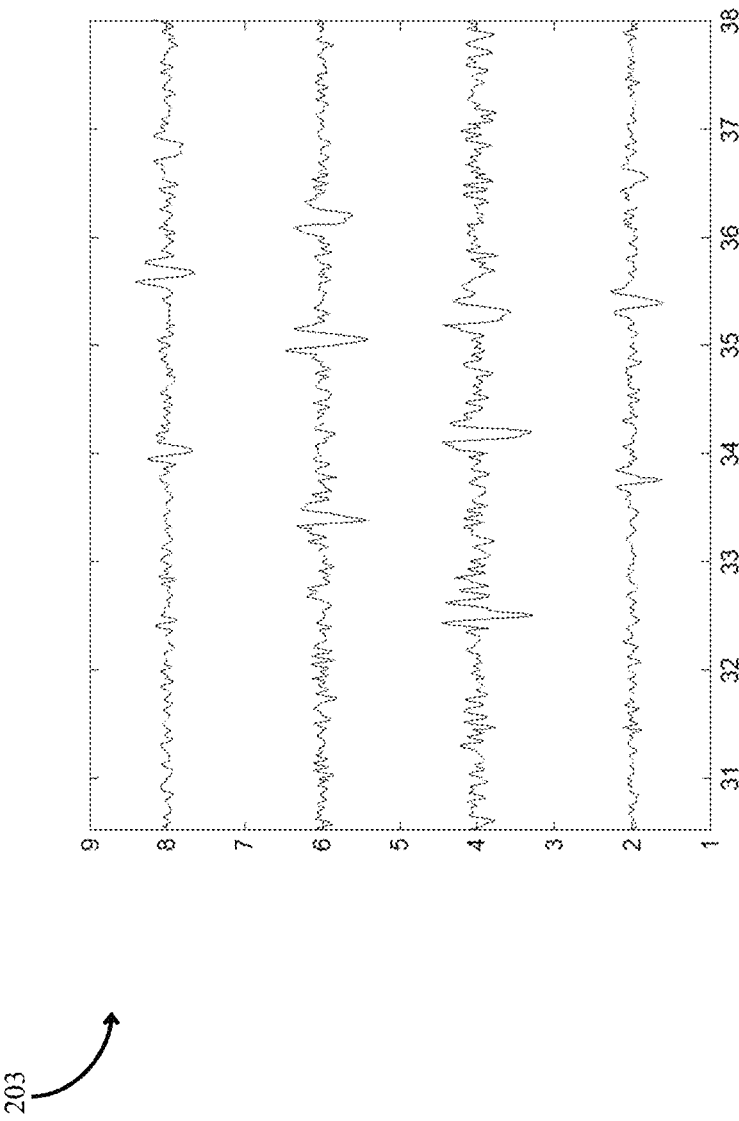
FIG. 2C shows a graph illustrating radar reflections, according to an embodiment of the present disclosure.

FIG. 2A shows a block diagram of the alternating optimization for estimating the radar image and the set of image shifts, according to an embodiment of the present disclosure. The alternating optimization is executed by the processor 107. At block 205, a radar image is estimated based on the transmitted pulses 201 and radar reflections 203. FIG. 2B shows a graph illustrating transmitted pulses 201, according to an embodiment of the present disclosure. FIG. 2C shows a graph illustrating radar reflections 203, according to an embodiment of the present disclosure. The estimation of the radar image is explained in detail below with reference to FIGS. 3A-3D.

At block 207, a set of image shifts corresponding to different uncertainties of the set of antennas 101 are estimated. The estimation of the set of image shifts is explained in detail below with reference to FIGS. 4A and 4B. Further, at block 209, the estimated radar image is updated based on the set of image shifts. The updating of the estimated radar image 309 is explained in detail below with reference to FIG. 5A.

The steps of estimating the set of image shifts followed by updating the radar image are conducted iteratively 211 until a termination condition is met. When the termination condition is met, a focused radar image 213 is outputted.

Figure 3A:
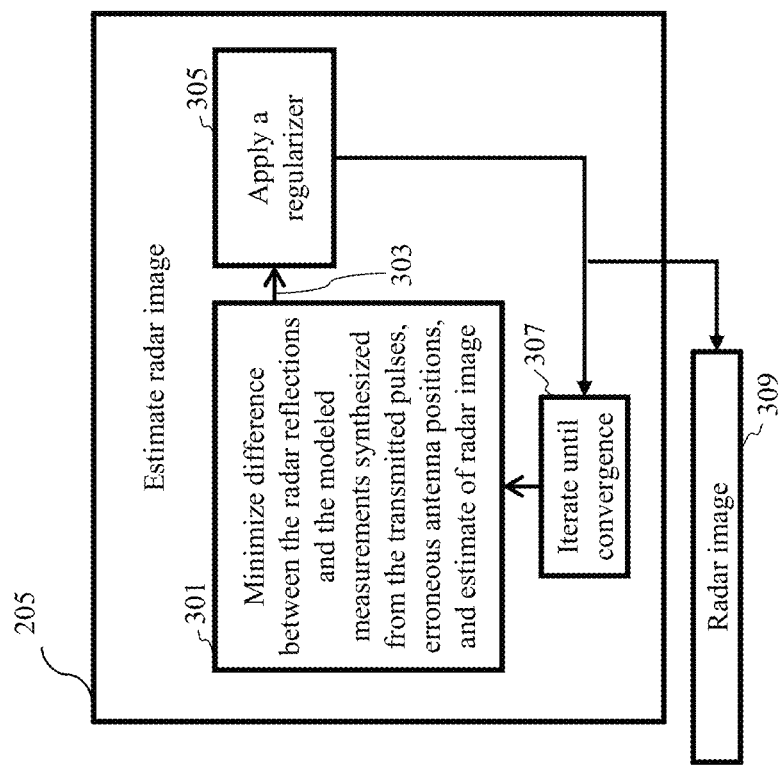
FIG. 3A shows a block diagram of a method for estimating the radar image, according to an embodiment of the present disclosure.

FIG. 3A shows a block diagram of a method for estimating the radar image, according to an embodiment of the present disclosure. In an embodiment, the measurements of each antenna are modelled based on the transmitted pulses 201 and erroneous antenna positions. At block 301, a difference between the radar reflections 203 and the modelled measurements is minimized to produce an estimate of the radar image 303. Further, at block 305, a regularizer is applied on the estimated radar image 303 to filter noise from the estimated radar image 303. In an embodiment, the regularizer may be a fused Lasso regularizer that includes a one norm regularizer and a total variation (TV) regularizer. The one norm regularizer imposes sparsity on the estimated radar image 303, while the TV regularizer reduces noise in the estimated radar image 303 to produce a filtered radar image.

Further, the measurements are modeled using the filtered radar image, the transmitted pulses 201, and the erroneous antenna positions. Further, a difference between the radar reflections 203 and the modeled measurements is minimized to produce an estimate of the radar image, and subsequently, the regularizer is applied on the estimated radar image to produce a filtered radar image. The steps of minimizing the difference between the radar reflections and the modelled measurements and applying the regularizer are conducted iteratively until convergence 307. Upon convergence, an estimate of the radar image 309 is outputted.

Some embodiments are based on observation that the regularizer (e.g., the fused Lasso regularizer) used in the alternating optimization to filter the estimated radar image (e.g., the estimated radar image 121) may not be suitable when the noise in the estimated radar image is large because the noise may introduce image-domain artifacts that also tend to cluster together and therefore resemble a shape of true objects. As a result, the alternating optimization may focus on a false object and consequently produce incorrect antenna position correction.

Some embodiments are based on realization that, to mitigate such a problem, a neural network denoiser can be used instead of the regularizer. The neural network denoiser includes a neural network trained to denoise the estimated radar image 303. In other words, the neural network denoiser filters the noise from the estimated radar image 303. The neural network denoiser is advantageous over the regularizer because of high modelling power of the neural network and its ability to represent signal structure that surpasses an explicit sparsity in image domain and its gradient.

Figure 3B:
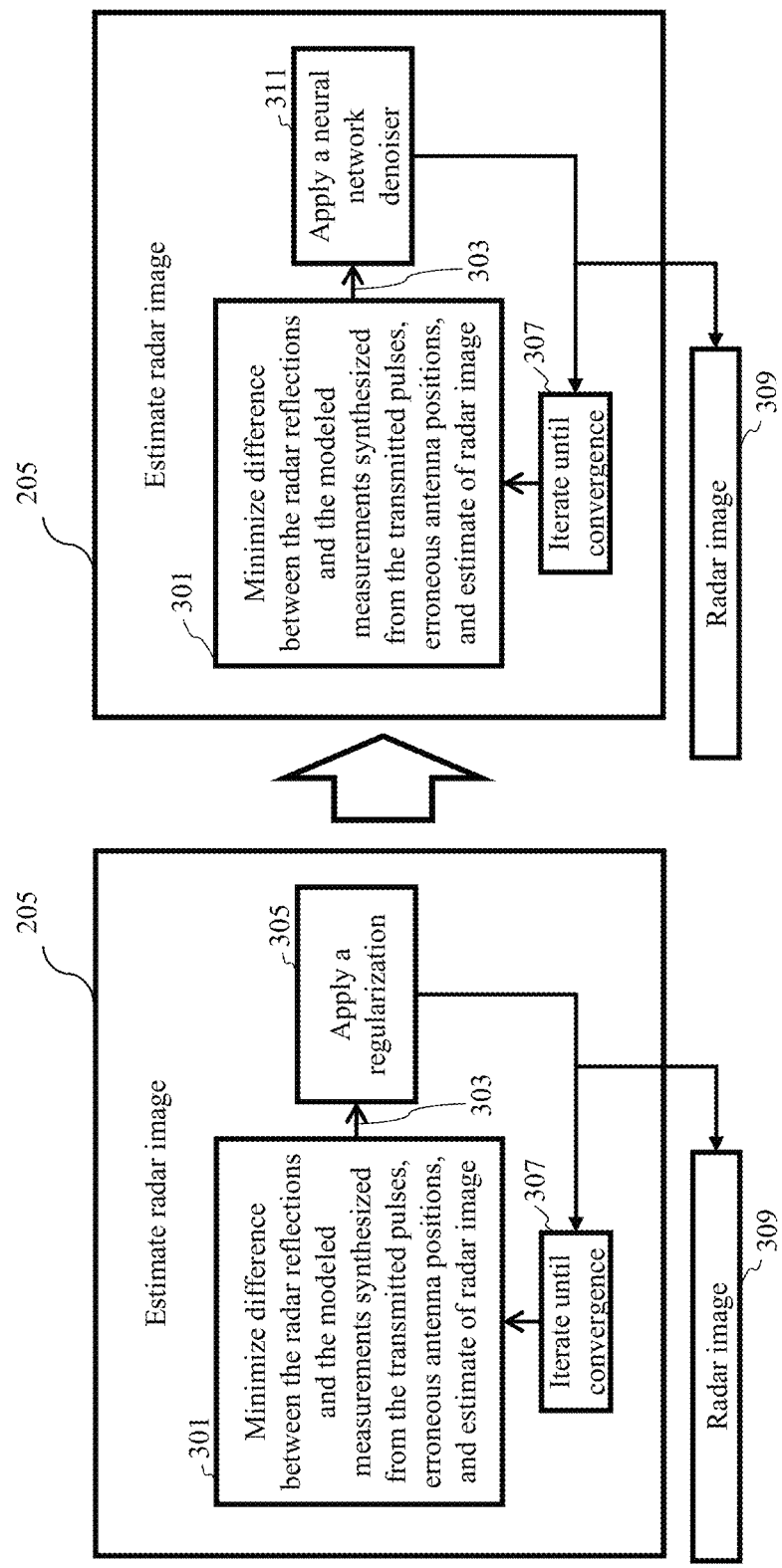
FIG. 3B shows a block diagram of a method for estimating the radar image using a neural network denoiser, according to an embodiment of the present disclosure.

To that end, for estimating the radar image, instead of applying the regularizer on the estimated radar image 303, the neural network denoiser is applied 311, as shown in FIG. 3B.

Some embodiments are based on recognition that artifacts/noises in the estimated radar image 303 are due to iterative update steps that occur during the minimization of the difference between the radar reflections and the modelled measurements. The artifacts/noises due to the iterative update steps are unknown and unpredictable and may not be same as noise that the neural network is trained on. Therefore, the estimated radar image 303 may include noises that the neural network denoiser is not trained on. When such radar images are applied to the neural network denoiser, the neural network denoiser may inject errors in the output radar image 309. Therefore, merely replacing the regularizer with the neural network denoiser is not sufficient and may pose problems.

Figure 3C:
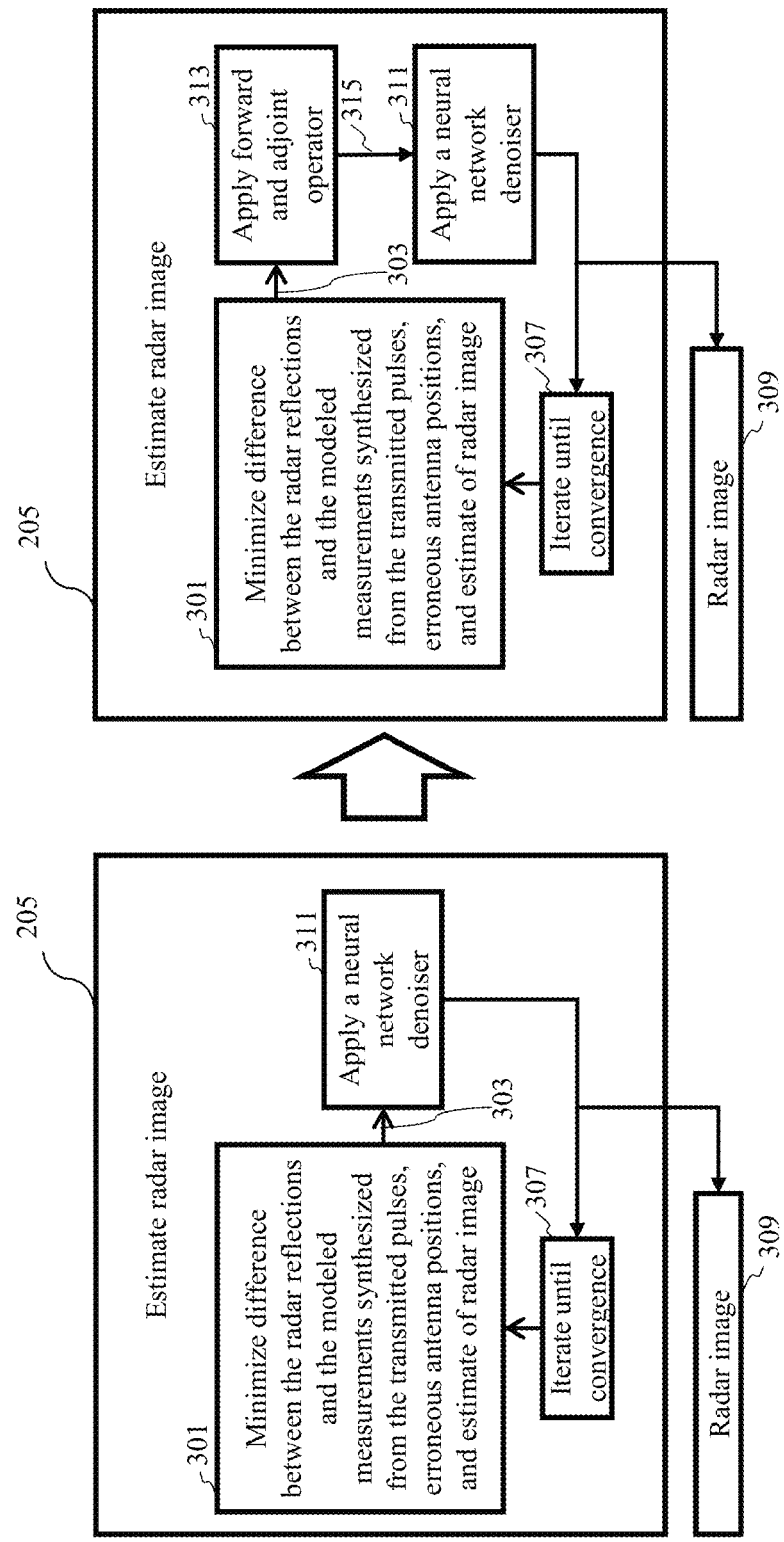
FIG. 3C shows a block diagram of a method for estimating the radar image using forward and adjoint radar operators, and the neural network denoiser, according to an embodiment of the present disclosure.

Some embodiments are based on realization that to manage the noises that the that the neural network denoiser is not trained on, the estimated radar image 303 can be filtered, prior to applying 311 the neural network denoiser, by applying 313 a forward radar operator and an adjoint radar operator on the estimated radar image 303, as shown in FIG. 3C. The forward and the adjoint radar operators filter the noise from the estimated radar image 303 that the neural network denoiser is not trained on, to produce a filtered radar image 315. Further, the neural network denoiser is applied 311 on the filtered radar image 315. As a result, the neural network denoiser does not inject errors in the output radar image 309 and reconstruction of the radar image remains stable.

The steps of minimizing 301 the difference between the radar reflections and the modelled measurements, applying 313 the forward and the adjoint radar operators, and applying 311 the neural network denoiser are conducted iteratively until convergence 307. Upon convergence, the estimate of the radar image 309 is outputted.

Figure 3D:
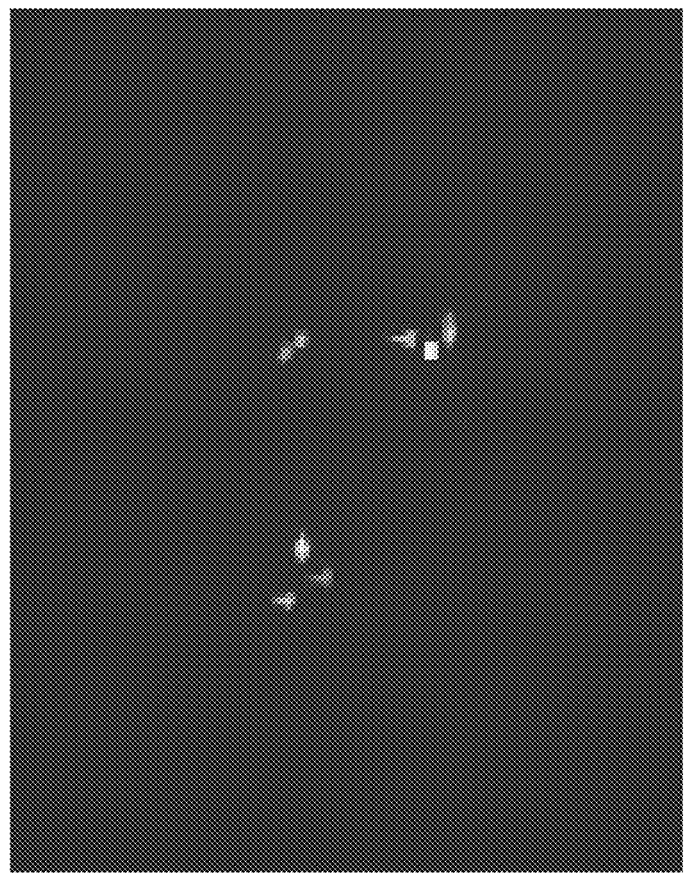
FIG. 3D shows an exemplar radar image, according to an embodiment of the present disclosure.

FIG. 3D shows an exemplar estimate of the radar image 309, according to an embodiment of the present disclosure.

After determining the estimate of the radar image 309, the set of image shifts corresponding to different uncertainties of the set of antennas 101 are estimated. The estimation of the set of image shifts is explained in detail below with reference to FIGS. 4A and 4B.

Figure 4A:
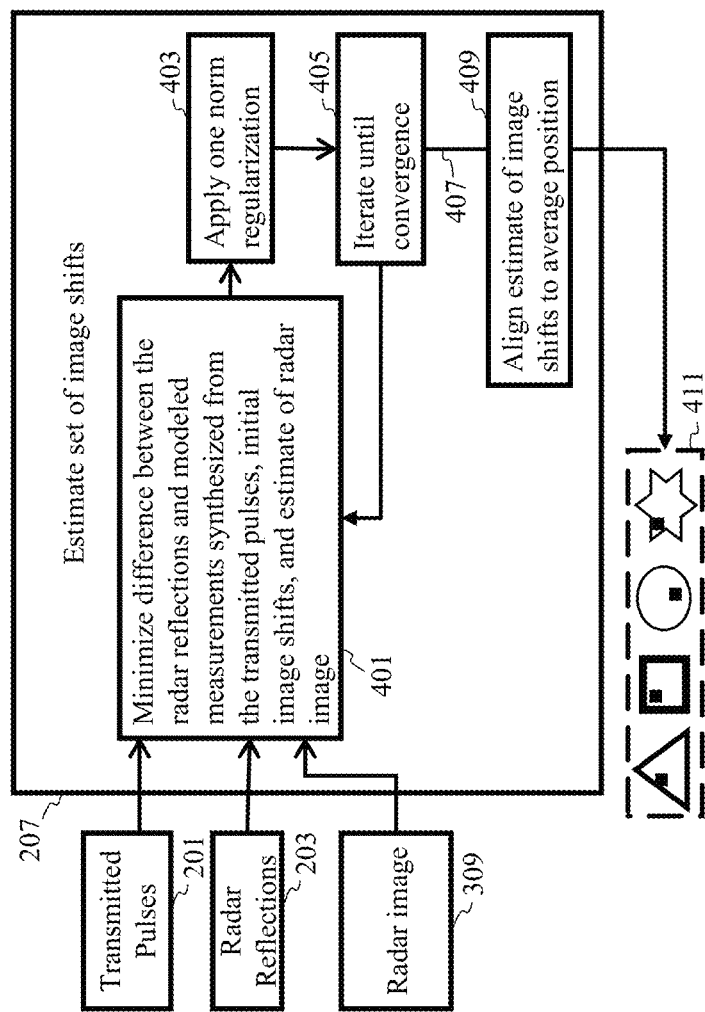
FIG. 4A shows a block diagram of a method for estimating the set of image shifts, according to an embodiment of the present disclosure.

FIG. 4A shows a block diagram of a method for estimating the set of image shifts, according to an embodiment of the present disclosure. In an embodiment, the measurements are modelled based on the transmitted pulses 201, initial image shifts, and the radar image 309. At block 401, a difference between the radar reflections 203 and the modelled measurements is minimized. At block 403, one norm regularization is applied to enforce a single non-zero entry in the set of image shifts. The steps of minimizing 401 the difference between the radar reflections and the modelled measurements and applying 403 the one norm regularization 403 are conducted iteratively 405 until convergence. Upon convergence, an estimate of the set of image shifts 407 is outputted.

Figure 4B:
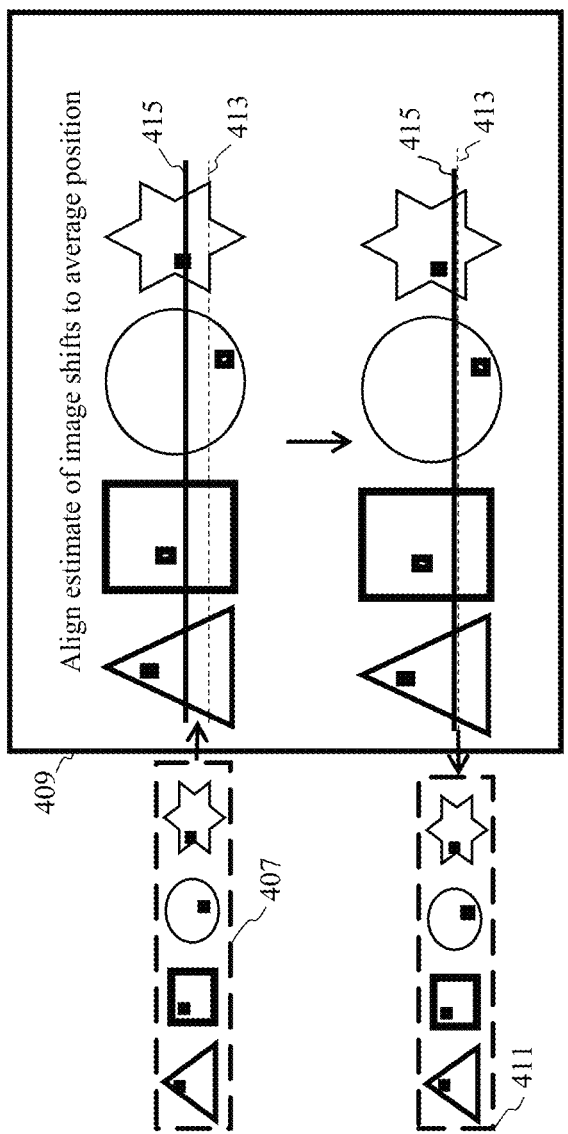
FIG. 4B shows a schematic illustrating aligning of the estimated set of image shifts according to an average assumed position of the antennas, according to an embodiment of the present disclosure.

Further, at block 409, the estimated set of image shifts 407 is aligned according to average of true positions of the set of antennas 101 to produce a new estimate of a set of image shifts 411. FIG. 4B shows a schematic illustrating aligning of the estimated set of image shifts 407 according to average 413 of true positions of the set of antennas 101, according to an embodiment of the present disclosure. The average 413 of true positions of the set of antennas 101 is known. The estimated set of image shifts 407 is aligned such that an average 415 of the estimated set of image shifts is equal to the average 413 of the true positions of the set of antennas 101.

Further, the estimated radar image 309 is updated based on the new estimate of set of image shifts 411, such that, for each of the set of antennas 101, the estimate of the radar image shifted by the corresponding image shift fits the measurements of the antenna. The updating of the estimated radar image 309 is explained in detail below with reference to FIG. 5A.

Figure 5A:
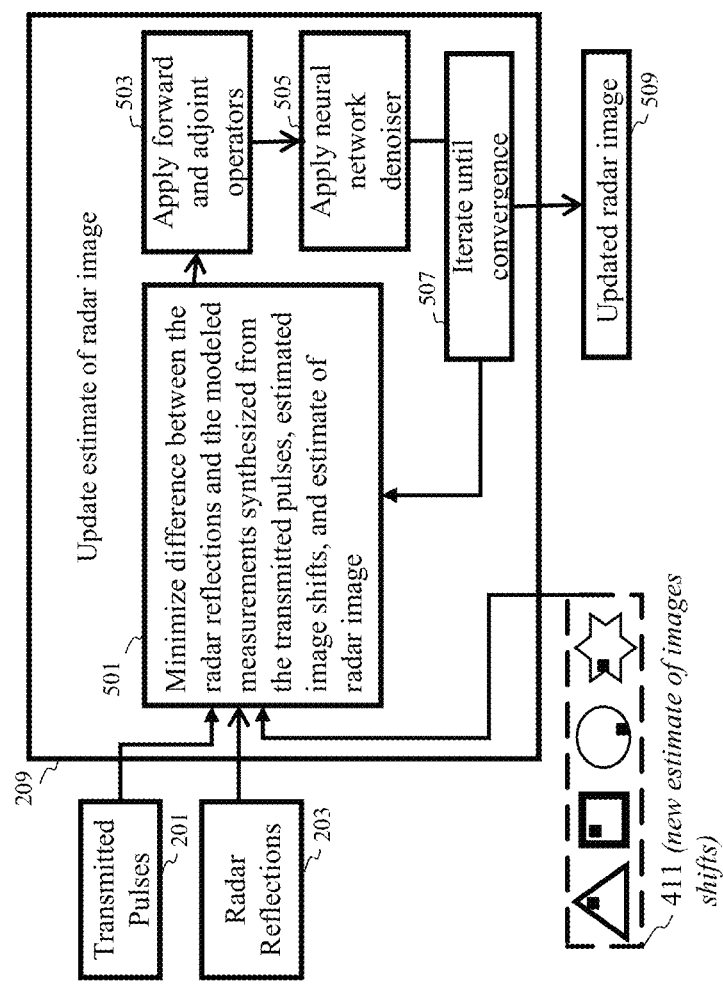
FIG. 5A shows a block diagram of a method for updating the estimated radar image, according to an embodiment of the present disclosure.

FIG. 5A shows a block diagram of a method for updating the estimated radar image 309, according to an embodiment of the present disclosure. In an embodiment, the measurements are modelled based on the transmitted pulses 201, the new estimate of set of image shifts 411, and the radar image 309. At block 501, a difference between the radar reflections 203 and the modelled measurements is minimized to produce an estimate of the radar image. At block 503, the forward and the adjoint radar operators are applied on the estimated radar image to produce a filtered radar image. Further, at block 505, the neural network denoiser is applied on the filtered radar image to denoise the filtered radar image.

The steps of minimizing 501 the difference between the radar reflections and the modelled measurements, applying 503 the forward and the adjoint radar operators, and applying 505 the neural network denoiser are conducted iteratively 507 until convergence. Upon convergence, an updated radar image 509 is outputted.

Figure 5B:
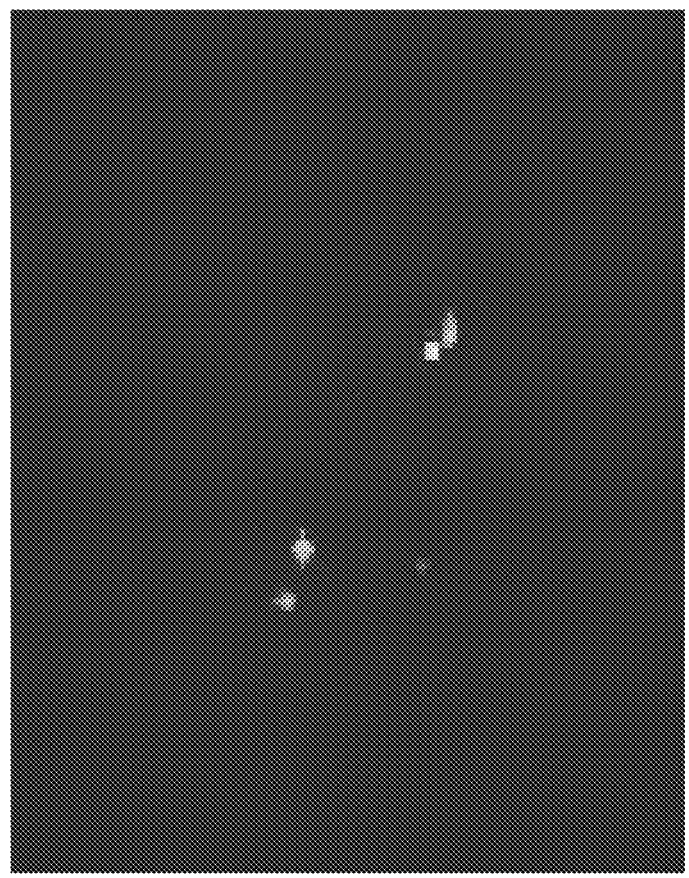
FIG. 5B shows an exemplar updated radar image, according to an embodiment of the present disclosure.

FIG. 5B shows an exemplar updated radar image 509, according to an embodiment of the present disclosure.

The steps of estimating the set of image shifts followed by updating the radar image are conducted iteratively until the termination condition is met. When the termination condition is met, the focused radar image 213 is outputted. The termination condition may be a number of iterations or a condition where the updated radar images of two consecutive iterations remain unchanged.

Figure 5C:
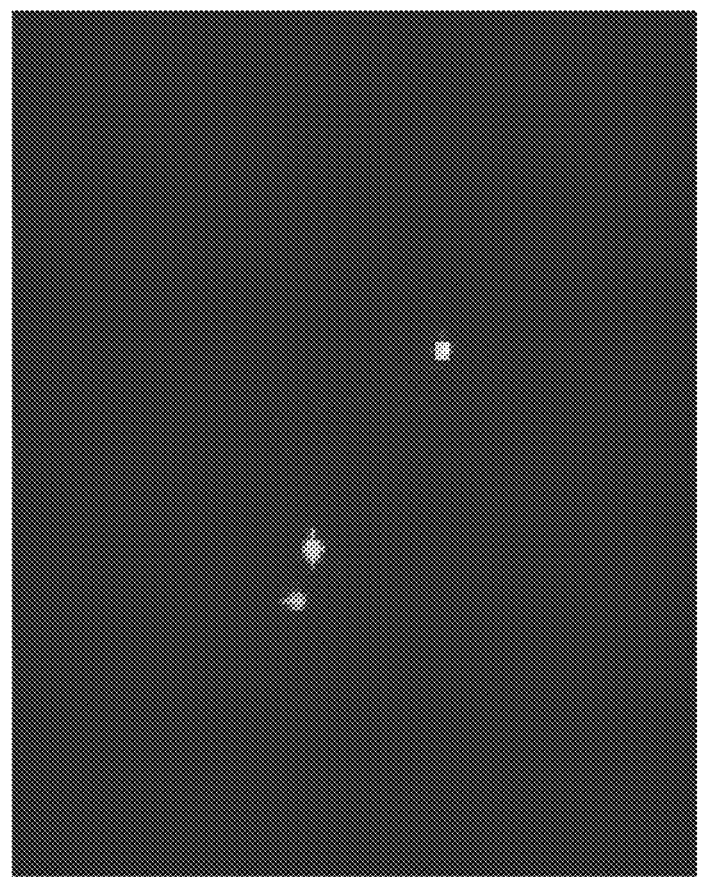
FIG. 5C shows an exemplar focused radar image, according to an embodiment of the present disclosure.

FIG. 5C shows an exemplar focused radar image 213, according to an embodiment of the present disclosure. The aforesaid problem of generating the focused radar image 213 using the alternating optimization is referred to as the sparse recovery problem.

In an embodiment, the neural network denoiser that denoises a filtering of the estimate of the radar image, includes a residual Unet architecture. Additionally or alternatively, in an alternate embodiment, the neural network denoiser includes a denoising convolutional neural network architecture.

Figure 6:
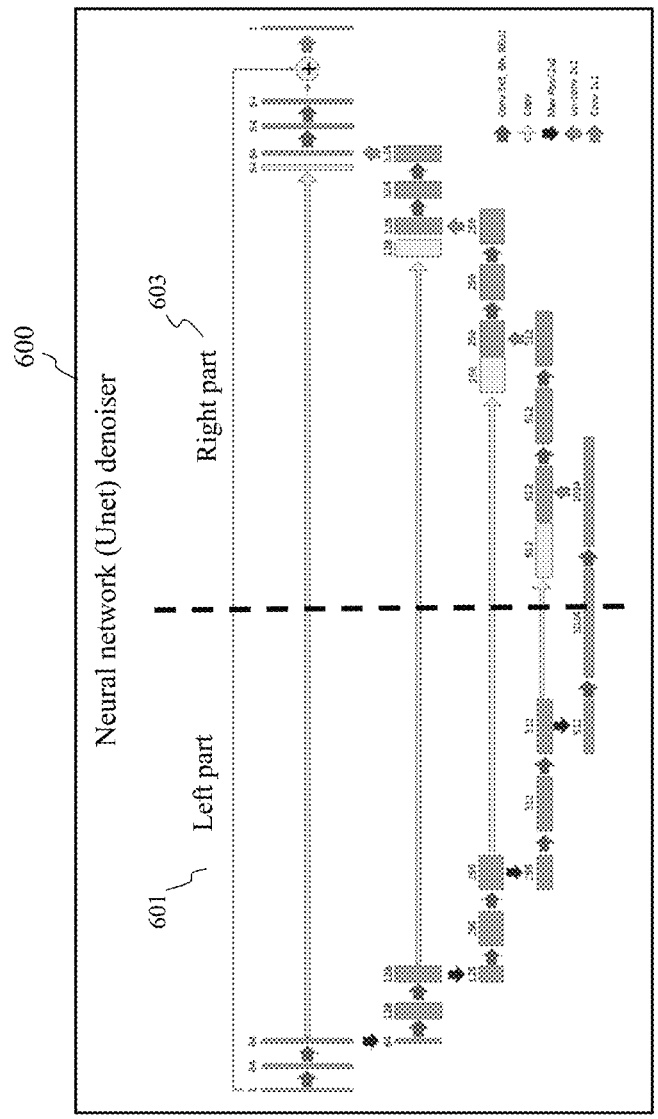
FIG. 6 shows a residual Unet architecture of the neural network denoiser, according to an embodiment of the present disclosure.

FIG. 6 shows a residual Unet architecture 600, according to an embodiment of the present disclosure. The residual Unet architecture 600 is symmetric and includes two parts, namely, left part 601 and right part 603. The left part 601 is called contracting path, which is constituted by a general convolutional process. The right part 603 is expansive path, which is constituted by transposed 2d convolutional layers.

Some embodiments are based on realization that the forward and the adjoint radar operators filter the noise from the estimated radar image, that the neural network denoiser is not trained on, therefore the neural network denoiser need not be trained with a large training dataset including all possible noises that may be observed in the alternative optimization. Thus, the neural network denoiser can be trained with a simpler training dataset. In an embodiment, the simpler training dataset includes input-output pairs ($z_m$, $x_m$), where training input images $z_m$ are back projected images formed by applying the back projection operator $A_m^H$ to example radar measurements $y_m = A_m x_m + n$, such that, $z_m = A_m^H y_m$; and the output images $x_m$ are ground truth object radar images, and where n represents added noise. As the neural network denoiser can be trained with the simple training dataset, the training of the neural network denoiser becomes easier and faster.

Additionally, some embodiments are based on recognition that the neural network denoiser based radar autofocus problem of the present disclosure (explained in FIGS. 2A to 5C) is capable of reconstructing the objects with fewer measurements. This feature allows the embodiments of the present embodiments to be deployed in an object tracking system where radar characteristics of the objects are determined at a rate that is faster than motion of the objects. Such a process allows to continuously detect the objects and perform object tracking-by-detection.

Moreover, detections of moving objects received from the radar reflections may sometimes provide a partial view of the object when the object has a large extension relative to a beam width of the radar. In such scenarios, the neural network denoiser can be trained to reconstruct a partial shape of the object that is intended to be tracked instead of reconstructing point objects of strong reflectors of the object. The reconstructed partial shapes can then be used to facilitate additional modules that determine a current state of the object, where the state of the object includes information on a size, an orientation, and/or a position of the object.

Figure 7A:
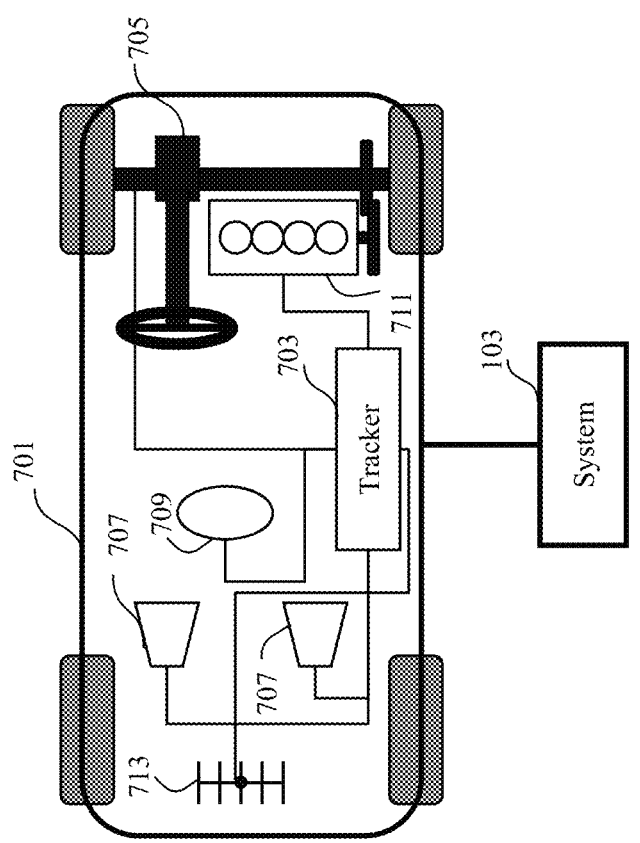
FIG. 7A shows a schematic of a vehicle including a tracker for determining a state of a moving object, according to an embodiment of the present disclosure.

FIG. 7A shows a schematic of a vehicle 701 including a tracker 703 for determining a state of a moving object, according to an embodiment of the present disclosure. The tracker 703 is associated with the system 103. The vehicle 701 may be any type of wheeled vehicle, such as a passenger car, a bus, or a rover. Also, the vehicle 701 can be an autonomous or semi-autonomous vehicle. In one embodiment, a steering system 705 of the vehicle 701 is controlled by the tracker 703. Additionally or alternatively, the steering system 705 may be controlled by a driver of the vehicle 701.

In some embodiments, the vehicle 701 includes an engine 711, which can be controlled by the tracker 703 or by other components of the vehicle 701. In some embodiments, the vehicle 701 includes an electric motor in place of the engine 711 which is controlled by the tracker 703 or by other components of the vehicle 701. The vehicle 701 can also include one or more sensors 707 to sense the surrounding environment. Examples of the sensors 707 include distance range finders, such as radars. In some embodiments, the vehicle 701 includes one or more other sensors 709 to sense its current motion parameters and internal status. Examples of the one or more other sensors 709 include global positioning system (GPS), accelerometers, inertial measurement units, gyroscopes, shaft rotational sensors, torque sensors, deflection sensors, pressure sensor, and flow sensors. The sensors, such as the one or more sensors 707 and the one or more other sensors 709, provide information to the tracker 703. The vehicle 701 may be equipped with a transceiver 713 enabling communication capabilities of the tracker 703 through wired or wireless communication channels with the system 103. The tracker 703 includes a processor, and a memory that stores instructions that are executable by the processor. The processor can be a single core processor, a multi-core processor, a computing cluster, or any number of other configurations. The memory can include random access memory (RAM), read only memory (ROM), flash memory, or any other suitable memory systems.

Figure 7B:
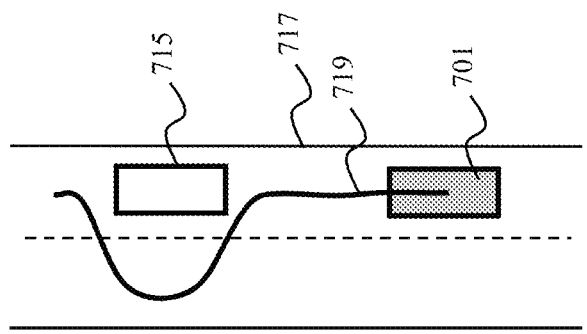
FIG. 7B shows a schematic illustrating controlling of the vehicle based on the state of the moving object, according to an embodiment of the present disclosure.

FIG. 7B shows a schematic illustrating controlling of the vehicle 701 based on the state of a moving object such as a vehicle 715, according to an embodiment of the present disclosure. The vehicles 701 and 715 are moving along a road 717 and the vehicle 701 is behind the vehicle 715. The system 103 associated with the vehicle 701 is communicatively coupled to the set of antennas 101 shown in FIG. 1A. The set of antennas 101 may be covering a region of interest including the road 717. The set of antennas 101 may transmit pulses to the region of interest and receive corresponding reflections. Further, the system 103 receives the reflections from the set of antennas 101 and generates a radar image by solving the sparse recovery problem described in previous embodiments. The radar image indicates locations of point detections in a space of the vehicle 701. For instance, the radar image provides a set of point detections of the vehicle 715. The radar image has no artifacts, less noise, is generated by computationally effective techniques described in previous embodiments and is a better sampling of a distribution of possible detections for the vehicle 715. The radar image is input to the tracker 703. In an embodiment, the tracker 703 determines a state of the vehicle 715 based on the received radar image, a motion model and a compound measurement model of the vehicle 715. The motion model and the compound measurement model may be stored in the memory of the tracker 703. According to an embodiment, the compound measurement model includes multiple probabilistic distributions constrained to lie on a contour of the vehicle 715 with a predetermined relative geometrical mapping to a center of the vehicle 715.

Additionally, in some embodiments, the tracker 703 generates control inputs based on the state of the vehicle 715 for controlling the vehicle 701. The control inputs, for example, include commands specifying values of one or combination of a steering angle of wheels of the vehicle 701, a rotational velocity of the wheels, and an acceleration of the vehicle 701. The control inputs aim to keep the vehicle 701 within particular bounds of the road 717 and aims to avoid the vehicle 715. For example, the control inputs cause the vehicle 701 to navigate along a trajectory 719 to safely pass the vehicle 715.

Figure 8:
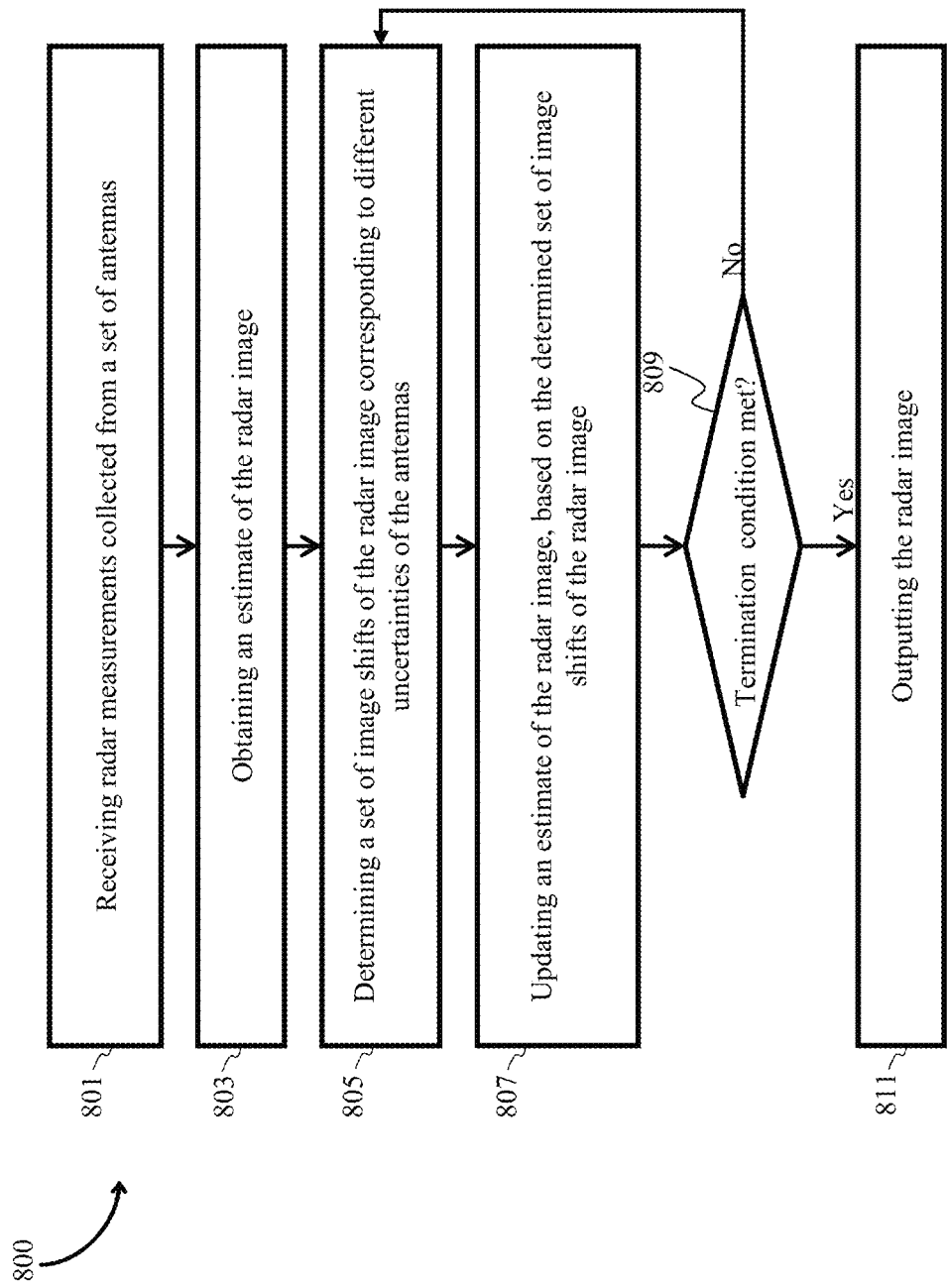
FIG. 8 shows a block diagram of a method for determining a radar image of a scene, according to an embodiment of the present disclosure.

FIG. 8 shows a block diagram of a method 800 for generating a radar image of a scene, according to an embodiment of the present disclosure. At block 801, the method 800 includes receiving radar measurements collected from a set of antennas (such as the set of antennas 101). The radar measurements, for example, correspond to the reflections 117 explained in FIG. 1B.

At block 803, the method 800 includes obtaining an estimate of the radar image. The estimated of the radar image is obtained as explained in FIG. 3C.

At block 805, the method 800 includes determining a set of image shifts of the radar image corresponding to different uncertainties of the set of antennas. The set of image shifts is determined as explained in detail in FIGS. 4A and 4B.

At block 807, the method 800 includes updating the estimate of the radar image, based on the determined set of image shifts of the radar image, such that, for each of the antennas, the estimate of the radar image shifted by the corresponding shift of the radar image fits the measurements of the antenna. The estimate of the radar image is updated as explained in detail in FIG. 5A.

At block 809, the method 800 includes determining if a termination condition is met. If the termination condition is not met, then further a new set of image shifts is determined.

The steps of determining the set of image shifts followed by updating the estimate of the radar image are executed iteratively until the termination condition is met. The termination condition may be a number of iterations or a condition where the radar images of two consecutive iterations remain unchanged.

If the termination condition is met, then, at block 811, the method 800 includes outputting the radar image.

The formulation of the neural network denoiser based radar autofocus problem is mathematically described below.
Mathematical Computation An image of the ROI 115 is to be recovered by processing F-dimensional frequency-domain measurements $\{\tilde{y}_m\}_{m=1}^M$ from M distributed antennas 101 that suffer from position ambiguity. The present disclosure has developed an image reconstruction framework FIGS. 1C, 1D, 1E, wherein a perturbation in the antenna positions results in a measured signal that corresponds to an image-domain convolution model as illustrated in FIGS. 1D, 1E, 1F. More precisely, by denoting a radar propagation matrix at correct antenna positions by $\tilde{A}_m$, and denoting the corresponding matrix at incorrect positions by $A_m$, results $\tilde{y}_m = \tilde{A}_m x \neq A_m x$. However, the only provided measurements are $\tilde{y}_m$ and the matrices $A_m$. The position ambiguity can be modeled as a time-domain convolution with the measurements, or equivalently, as a gain and phase ambiguity in the frequency-domain of the radar signal, that is, $$\tilde{y}_m = D_{\hat{g}_m} A_m x + n_m \qquad (1)$$

where $D_{\hat{g}_m}$ is a diagonal matrix with a phase correction vector $\hat{g}_m \in \mathbb{C}^F$ on its diagonal entries, and $n_m$ is a measurement noise vector. The system in (1) is ill-posed in general since for any M measurements, which leaves us with MF equations and MF+N unknowns. Alternatively, an aspect of the present disclosure is to represent the gain and phase ambiguity as an image-domain convolution FIG. 1D, 1E where a two-dimensional spatial shift kernel $h_m$ is applied to the radar image x, i.e., $$\tilde{y}_m = A_m(x * A_m) + n_m \qquad (2)$$

Under this particular model, the shift kernels are one-sparse vectors with unknown support locations, thereby reducing unknown degrees of freedom to M log(F)+N.
Signal Model The present disclosure includes considering a two-dimensional radar imaging scenario in which M distributed antennas are used to detect K objects. The objects are located within a spatial region of interest that is discretized on a grid $\Omega \subset \mathbb{R}^2$, $|\Omega|=N$ and $N=N_x \times N_y$, with $N_x$ and $N_y$ specifying a number of grid points in horizontal and vertical directions. Denote by $l \in \Omega$ a spatial position of a grid-point in $\Omega$.

Let $\Gamma \subset \mathbb{R}^2$, $|\Gamma|=M$ be a set of all the spatial locations of the M antennas. Without loss of generality, assume that a subset of the antennas function as transmitter/receivers while the remaining antennas are only receivers. A transmitting antenna at position $r \in \Gamma$ emits a time-domain pulse p(t) with frequency spectrum P(ω), where ω=2πf is an angular frequency and f∈B is an ordinary frequency in a signal bandwidth B, |B|32 F.

Denote by $y_m := y(r_m, r'_m)$ and by $A_m := A(r_m, r'_m)$ the corresponding measurement vector and imaging operator of antenna pair $(r_m, r'_m)$ indexed by m. Let $\tilde{r}_m = r_m + e_m$ and $\tilde{r}'_m = r'_m + e'_m$ be perturbed transmitter and receiver positions, respectively, where $e_m$ and $e'_m$ denote positioning errors. The received antenna measurement $\tilde{y}_m := y(\tilde{r}_m, \tilde{r}'_m)$ observes scene reflectivity x through the perturbed imaging operator $\tilde{A}_m := A(\tilde{r}_m, \tilde{r}'_m)$, i.e., $$\tilde{y}_m = \tilde{A}_m x + n_m \qquad (3)$$

Since the operator $\tilde{A}_m$ is unknown, the received measurements $\tilde{y}_m$ are defined as a function of $A_m$ and x.

Convolution in Measurement-Domain

The present disclosure uses approaches for radar autofocus that utilize a gain and phase correction in frequency measurement to describe $\tilde{y}_m$ in terms of $A_m$ and x. More precisely, let $\hat{g}_m \in C^F$ be a complex valued vector corresponding to Fourier transform of a time-domain kernel $g_m \in R^M$. The received measurement is expressed as in (1). Therefore, given M measurements $\tilde{y}_m$, $m \in \{1 \ldots M\}$, the radar autofocus problem is regarded as a bilinear inverse problem in both the reflectivity image x and the phase correction vectors $\hat{g}_m$ for all m.

The system in (1) has F equations with F+N unknowns, which makes it severely ill-posed. Even in a case where x is sparse, the problem remains ill-posed since a general phase correction vector $\hat{g}_m$ continues to have F degrees of freedom. In order to make the problem tractable, the kernels $g_m = F_1^H \hat{g}_m$ can be assumed to be shift kernels, which reduces its degrees of freedom to a singe phase angle. However, the approximation that $g_m$ is a shift operator is only valid in the far field regime and where the position error can be approximated by a one-dimensional shift in a down-range direction of virtual antenna array.

Convolution in Image-Domain

The present disclosure also considers an alternate model to the convolution with a shift kernel in the measurement-domain by switching the convolution to the image-domain. Let $h_m \in R^{N_h^2}$, $N_h \leq \min\{N_x, N_y\}$ be a vectorized two-dimensional shift kernel of size $N_h \times N_h$. Under new model, the received signal of the antenna pair indexed by m is written as in (2).

The present disclosure considers the image-domain convolution model that can be expressed in the spatial Fourier domain as $$1. \ \tilde{y}_m = \tilde{A}_m x + n_m = \tilde{A}_m F_2^H D_{\hat{h}_m} \hat{x} + n_m \tag{4}$$

where $F_2$ is a two-dimensional Fourier transform operator applied to the vectorization of a matrix, $\hat{h}_m = F_2 h_m$, and $\hat{x} = F_2 x$ denote two-dimensional Fourier transforms $h_m$ and x, respectively, and $D_{\hat{h}_m}$ is a diagonal matrix with $\hat{h}_m$ on the diagonal. The present disclosure presents a block coordinate descent approach for computing the radar reflectivity image x and the spatial convolution filters $h_m$ from noisy measurements $\tilde{y}_m$.

Initially, first is to incorporate into the model in (4) the prior information that the radar image x is sparse and has a shape that can be learned from training data, and that the kernels $h_m$ are two-dimensional shift operators.

Therefore, a neural network denoising operator is used to refine the estimate of the radar image x, wherein a regularizer $R_x(\cdot)$ is added for x, and an $\ell_1$ norm regularizer $R_x(\cdot)$ to $h_m$. The overall optimization problem can be described as follows $$\min_{x \in C^n, h_m \in R_+^{N_h^2}} \sum_{m=1}^{M} \frac{1}{2} \left\| \tilde{y}_m - \tilde{A}_m F_2^H D_{\hat{h}_m} \hat{x} \right\|_2^2 + \mu R_h(h_m) + \lambda R_x(x) \tag{5}$$

subject to $1^T h_m = 1, \forall m \in \{1 \ldots M\}$ where 1 is all one vector, and as before, $\hat{h}_m = F_2 h_m$ and $\hat{x} = F_2 x$. Parameters μ and Δ are regularization parameters controlling a tradeoff between signal priors and data mismatch cost.

The neural network based regularizer $R_x(x)$ can be imposed implicitly through action of a neural network denoiser $\mathcal{T}(z_m)$ that is learned using training data examples composed of input-output pairs $(z_m, x_m)$, where training input images $z_m$ are back projected images formed by applying a back projection operator $A_m^H$ to example radar measurements $y_m = A_m x_m + n$, such that, $z_m = A_m^H y_m$; and output images $x_m$ are ground truth object radar images, and where n represents added noise.

Alternatively, the neural network based regularizer can be applied explicitly, given the neural network denoiser $\mathcal{T}(z_m)$, using a framework called regularization-by-denoising (RED), such that the regularizer is defined as $R_x(x) := x^H (x - \mathcal{T}(x))$.

On the other hand, a property of the shift kernel requires that every $h_m$ is one sparse with a nonzero entry equal to one. Since $h_m$ is nonnegative with a sum of its entries equal to one, the only regularization required is $\ell_1$ norm penalty:

$$R_h(h_m) = \sum_{m=1}^{M} \|h_m\|_1 \tag{6}$$

FIG. 9A shows a block coordinate descent algorithm 900a for solving (5), according to some embodiments of the present disclosure. The problem (5) is nonconvex and at least one goal of the present disclosure regarding this context is to find a stationary point to the problem (5). Therefore, the block coordinate descent algorithm 900a alternates between descent steps for each of x and $h_m$, for all m. FIG. 2A illustrates a block diagram of the steps involved in the algorithm shown in FIG. 9A. At step 901, the shift kernels $h_m$ are all initialized to no-shift kernel $h^0$, an $N_h \times N_h$ zero-valued matrix with a central entry set equal to one.

At step 903, an operator $A_x^m$ is determined for all m. At step 905, x is determined by executing a fista subroutine. For each descent step, a small number of iterations of fast iterative shrinkage/thresholding algorithm (FISTA) adapted to the appropriate regularizer of x 213 or $h_m$ 407 are applied. Moreover, every descent step of $h_m$, produces an estimate $\tilde{h}_m$ which does not necessarily satisfy shift kernel properties, since only a small number of FISTA iterations are run. Therefore, at step 907, a projector $P(\tilde{h}_n)$ is used onto a space of shift kernels which sparsifies $\tilde{h}_m$ by setting its largest entry that is closest to center to one and setting the remaining entries to zero.

FIG. 9B shows an algorithm 900b of FISTA subroutine for updating $h_m$, according to some embodiments of the present disclosure. FIG. 9C shows an algorithm 900c of FISTA subroutine for x, according to some embodiments of the present disclosure. In general, FISTA can be used to solve convex optimization problems of the form $$\min_{u \in S} D(u) + \lambda R(u) \tag{7}$$

where D (u) is a smooth data fidelity cost function and R is a regularizer which can be a non-smooth function. In context of the block coordinate descent algorithm, subroutine fista $(A_m, R, y_m, u_{init}, T)$ is defined as an algorithm that runs T iterations of FISTA procedure with a data fidelity cost function D(u), regularizer R, and initial guess $u_{init}$. The data fidelity cost function is specified by (5) as $$D(u) := \sum_{m=1}^{M} \frac{1}{2}\|\tilde{y}_m - A^m u\|_2^2 \qquad (8)$$

where u refers to either the image x or the sequence of convolution kernels $k_m$. The forward operator with respect to the image x given the estimates of the kernels $h_m^t$ at iteration t is defined as $$A_x^m(h_m^t) := A_m F_2^H D_{F_2^H h_m^t} F_2 \qquad (9)$$

Similarly, the forward operator with respect to $h_m$ given the estimate of the image $x^t$ at iteration t is defined as $$A_h^m(x^t) := A_m F_2^H D_{F_2 x^t} F_2 \qquad (10)$$

Note that the expression for D in (8) is separable in $h_m$ for every m. Therefore, the FISTA subroutines for updating $h_m$ for every m are described in FIG. 9A. Function $T_+(z; \tau)$ is a non-negative soft-thresholding operator that sets all values of z less than tau to zero. In FIG. 9B, updating procedure is specific for using explicit regularizing functions, such as, one-norm penalty or a fused Lasso penalty. A nonlinear thresholding function that is explicit to a penalty function that is used is denoted by $T_+(z; \alpha\mu)$. In FIG. 9C, updating procedure is specific for using a neural network denoiser, where the neural network denoiser is denoted by $T(v^t)$. A filtering step is performed in step 4 of the algorithm 900c to eliminate the noise that the neural network denoiser was not trained on during its training.

Figure 10:
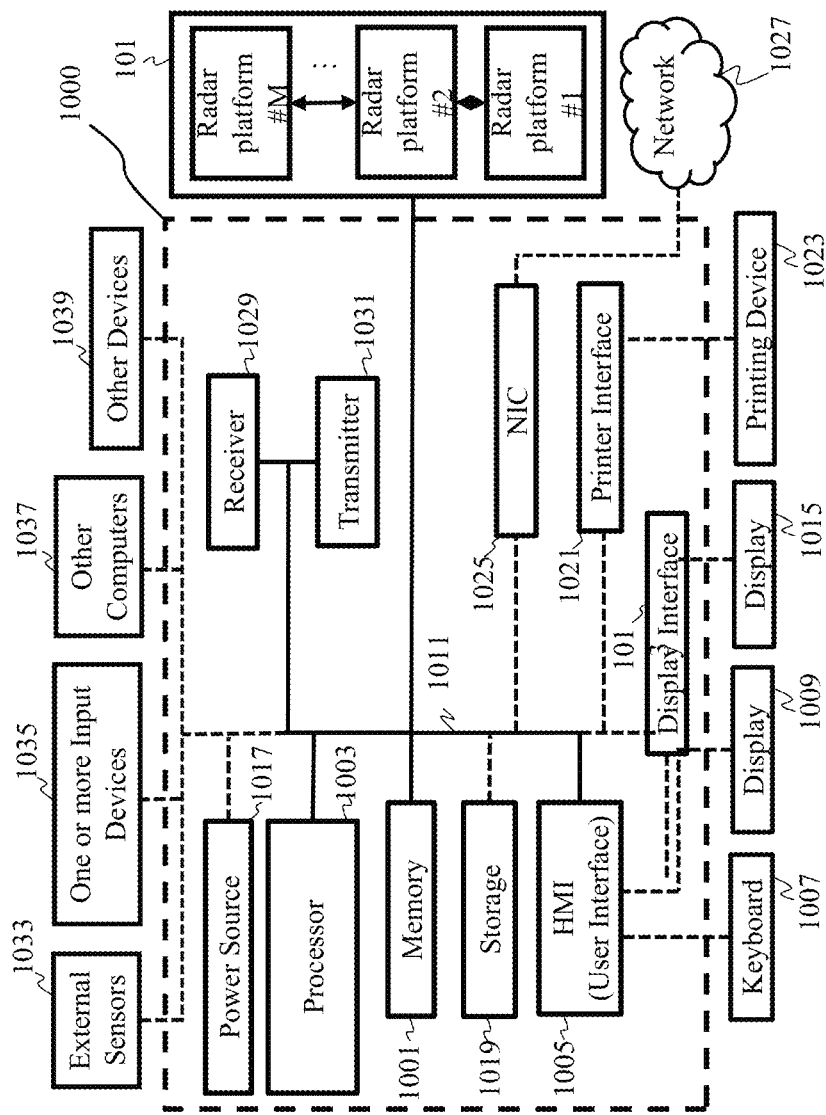
FIG. 10 is a block diagram of a computer system for generating the radar image of the scene, according to an embodiment of the present disclosure.

FIG. 10 is a block diagram of a computer system 1000 of the radar system contemplated by the present disclosure, in accordance with some embodiments of the present disclosure. The computer system 1000 is in communication with the set of radar platforms or antennas 101 and can store collected data in a memory 1001 that is processed by a processor 1003 of the computer system 1000. The computer system 1000 can include a human machine interface or user interface 1005 that can connect the computer system 1000 to a keyboard 1007 and display device 1009. The computer system 1000 can be linked through a bus 1011 to a display interface 1013 adapted to connect the computer system 1000 to a display device 1015, wherein the display device 1015 can include a computer monitor, camera, television, projector, or mobile device, among others.

The computer system 1000 can include a power source 1017, depending upon the application the power source 1017 may be optionally located outside of the computer system 1000. The processor 1003 may be one or more processors that can be configured to execute stored instructions, as well as be in communication with the memory 1001 that stores instructions that are executable by the processor 1003. The processor 1003 can be a single core processor, a multi-core processor, a computing cluster, or any number of other configurations. The processor 1003 is connected through the bus 1011 to one or more input and output devices. The memory 1001 can include random access memory (RAM), read only memory (ROM), flash memory, or any other suitable memory systems.

Still referring to FIG. 10, the computer system 1000 can also include a storage device 1019 adapted to store supplementary data and/or software modules used by the processor 1003. For example, the storage device 1019 can store historical data relating to predesigned radar platform trajectories, radar operating frequency bandwidth, transmitted waveform, estimated signal-to-noise ratio, image data relating to object recognition, imaging results using simulated noisy data with different methods dealing with position errors, among other things. The storage device 1019 can include a hard drive, an optical drive, a thumb-drive, an array of drives, or any combinations thereof.

Still referring to FIG. 10, a printer interface 1021 can also be connected to the computer system 1000 through the bus 1011 and adapted to connect the computer system 1000 to a printing device 1023, wherein the printing device 1023 can include a liquid inkjet printer, solid ink printer, large-scale commercial printer, thermal printer, UV printer, or dye-sublimation printer, among others. A network interface controller (NIC) 1025 is adapted to connect the computer system 1000 through the bus 1011 to a network 1027. The image data or related image data, among other things, can be rendered on a display device, imaging device, and/or printing device via the network 1027.

Still referring to FIG. 10, the image data or related image data, among other things, can be transmitted over a communication channel of the network 1027, and/or stored within the computer's storage device 1019 for storage and/or further processing. Further, the image data or related image data may be received wirelessly or wire from a receiver 1029 or transmitted via a transmitter 1031 wirelessly or wire, the receiver 1029 and transmitter 1031 are both connected to the computer system 1000 through the bus 1011.

The computer system 1000 may be connected to external sensors 1033, one or more input devices 1035, other computers 1037 and other devices 1039. The external sensors 1033 may include motion sensors, inertial sensors, a type of measuring sensor, etc. The external sensors 1033 may include sensors for, speed, direction, air flow, distance to an object or location, weather conditions, etc. The input devices 1035 can include, for example, a keyboard, a scanner, a microphone, a stylus, a touch sensitive pad or display.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The embodiments of the present disclosure include coherent distributed radar imaging by allowing location ambiguities, and on autofocusing for a single sensor array by distributed sensing with multiple sensors. In particular, a multi-static radar imaging approach where one transmitting/receiving radar platform and multiple receiving radar platforms are moving towards a region of interest (ROI) with position perturbations. The embodiments of the present disclosure detect objects inside the ROI. Due to inaccurate positioning and motion errors, the actual array positions are perturbed up to several times a central radar wavelength. Although image resolution of each sensor array may be low due to its small aperture size, a high-resolution image can be formed by jointly processing outputs of all distributed arrays with well-compensated position errors. The embodiments of the present disclosure assume a sparse scene and is realized iteratively by solving series of optimization problems for compensating position-induced phase errors, exploiting object signatures, and estimating antenna positions.

The embodiments of the present disclosure also provide for autofocus radar imaging for generating a radar image of objects situated in an area of interest using a single moving transmit radar platform or combination transmitter/receiver along with multiple spatially distributed moving radar receiver platforms or receivers. The moving radar receivers are perturbed with unknown position errors up to several radar wavelengths.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the appended claims to cover all such variations and modifications as come within the true spirit and scope of the present disclosure.

We claim:

1. A system for generating a radar image of a scene, the system comprising: at least one processor; and a memory having instructions stored thereon that, when executed by the at least one processor, cause the system to:
   receive radar measurements of the scene collected from a set of antennas, wherein the radar measurements are measurements associated with reflections of a radar pulse transmitted to the scene;
   generate the radar image of the scene by iteratively solving a sparse recovery problem until a termination condition is met, wherein the sparse recovery problem is solved as a regularized optimization with a regularizer implemented using a neural network denoiser, wherein an iteration of the regularized optimization is configured to:
      determine a set of image shifts of the radar image corresponding to different uncertainties of the set of antennas; and
      update an estimate of the radar image, based on the determined set of image shifts of the radar image, such that, for each of the antennas, the estimate of the radar image shifted by the corresponding shift of the radar image fits the radar measurements of the antenna;
      filter the estimate of the radar image by applying a forward radar operator and an adjoint radar operator to the estimate of the radar image; and
      denoise the filtered estimate of the radar image using the neural network denoiser; and
   render the radar image when the termination condition is met.

2. The system of claim 1, wherein the neural network denoiser comprises a residual Unet architecture.

3. The system of claim 1, wherein the neural network denoiser is trained based on a training dataset including input images and output images, wherein the input images include back projected images, and the output images include ground truth object radar images.

4. The system of claim 1, wherein the scene includes at least one moving object.

5. The system of claim 4, further comprising a tracker, wherein the tracker is configured to determine a state of the at least one moving object, based on at least the radar image.

6. The system of claim 5, wherein the state of at least one moving object includes one or combination of a size, an orientation, and a position of the at least one moving object.

7. The system of claim 1, wherein the set of antennas are under uncertainties caused by one or a combination of position ambiguities and clock ambiguities of each of the antennas.

8. A method for generating a radar image of a scene, comprising:
   receiving radar measurements of the scene collected from a set of antennas, wherein the radar measurements are measurements associated with reflections of a radar pulse transmitted to the scene;
   generating the radar image of the scene by iteratively solving a sparse recovery problem until a termination condition is met, wherein the sparse recovery problem is solved as a regularized optimization with a regularizer implemented using a neural network denoiser, wherein an iteration of the regularized optimization is configured to:

determine a set of image shifts of the radar image corresponding to different uncertainties of the set of antennas;

update an estimate of the radar image, based on the determined set of image shifts of the radar image, such that, for each of the antennas, the estimate of the radar image shifted by the corresponding shift of the radar image fits the radar measurements of the antenna;

filter the estimate of the radar image by applying a forward radar operator and an adjoint radar operator to the estimate of the radar image; and denoise the filtered estimate of the radar image using the neural network denoiser; and rendering the radar image when the termination condition is met.

9. The method of claim 8, wherein the neural network denoiser includes a residual Unet architecture.

10. The method of claim 8, wherein the neural network denoiser is trained based on a training dataset including input images and output images, wherein the input images include back projected images, and the output images include ground truth object radar images.

11. The method of claim 8, wherein the scene includes moving objects.

12. The method of claim 8, wherein the set of antennas are under uncertainties caused by one or a combination of position ambiguities and clock ambiguities of each of the antennas.

13. A non-transitory computer-readable storage medium embodied thereon a program executable by a processor for performing a method for generating a radar image of a scene, the method comprising:

receiving radar measurements of the scene collected from a set of antennas, wherein the radar measurements are measurements associated with reflections of a radar pulse transmitted to the scene;

generating the radar image of the scene by iteratively solving a sparse recovery problem until a termination condition is met, wherein the sparse recovery problem is solved as a regularized optimization with a regularizer implemented using a neural network denoiser, wherein an iteration of the regularized optimization is configured to:

determine a set of image shifts of the radar image corresponding to different uncertainties of the set of antennas;

update an estimate of the radar image, based on the determined set of image shifts of the radar image, such that, for each of the antennas, the estimate of the radar image shifted by the corresponding shift of the radar image fits the radar measurements of the antenna;

filter the estimate of the radar image by applying a forward radar operator and an adjoint radar operator to the estimate of the radar image; and denoise the filtered estimate of the radar image using the neural network denoiser; and rendering the radar image when the termination condition is met.

14. The non-transitory computer-readable storage medium of claim 13, wherein the neural network denoiser includes a residual Unet architecture.

15. The non-transitory computer-readable storage medium of claim 13, wherein the neural network denoiser is trained based on a training dataset including input images and output images, wherein the input images include back projected images and the output images include ground truth object radar images.

16. The non-transitory computer-readable storage medium of claim 13, wherein the scene includes moving objects.

17. The non-transitory computer-readable storage medium of claim 13, wherein the set of antennas are under uncertainties caused by one or a combination of position ambiguities and clock ambiguities of each of the antennas.

* * * * *